US008483031B2

(12) United States Patent
Komma et al.

(10) Patent No.: US 8,483,031 B2
(45) Date of Patent: Jul. 9, 2013

(54) OPTICAL HEAD DEVICE, OPTICAL INFORMATION DEVICE AND INFORMATION PROCESSING DEVICE

(75) Inventors: Yoshiaki Komma, Osaka (JP); Kousei Sano, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/391,115

(22) PCT Filed: Jun. 16, 2011

(86) PCT No.: PCT/JP2011/003452
§ 371 (c)(1),
(2), (4) Date: Feb. 17, 2012

(87) PCT Pub. No.: WO2011/161914
PCT Pub. Date: Dec. 29, 2011

(65) Prior Publication Data
US 2012/0170431 A1 Jul. 5, 2012

(30) Foreign Application Priority Data
Jun. 21, 2010 (JP) ................................ 2010-140091

(51) Int. Cl.
G11B 7/00 (2006.01)
(52) U.S. Cl.
USPC .......................... 369/94; 369/112.22; 369/118
(58) Field of Classification Search
USPC .............. 369/94, 108, 44.24, 112.01, 112.22, 369/118
See application file for complete search history.

(56) References Cited

U.S. PATENT DOCUMENTS

| 5,619,371 | A  | * | 4/1997 | Pontius ............................ 369/94 |
| 7,283,435 | B2 |   | 10/2007 | Kuze et al. |
| 7,539,089 | B2 |   | 5/2009 | Kuze et al. |
| 7,969,853 | B2 |   | 6/2011 | Nakatani et al. |
| 2004/0218484 | A1 |   | 11/2004 | Kuze et al. |
| 2007/0007430 | A1 | * | 1/2007 | Yamamoto ................. 250/201.5 |

(Continued)

FOREIGN PATENT DOCUMENTS

| JP | 2007-213709 | 8/2007 |
| JP | 2008-198336 | 8/2008 |

(Continued)

OTHER PUBLICATIONS

International Search Report issued Sep. 27, 2011 in International (PCT) Application No. PCT/JP2011/003452.

Primary Examiner — Thang Tran
(74) Attorney, Agent, or Firm — Wenderoth, Lind & Ponack, L.L.P.

(57) ABSTRACT

An optical head device includes a light blocking region disposed on a light flux of a reflected light beam resulting from reflection by a recording layer on which a blue light beam is focused, and blocks, when there are at least two recording layers on a blue light beam incident side of the recording layer on which the blue light beam is focused or on a side thereof opposite to the blue light beam incident side, reflected light beams resulting from reflection by the at least two recording layers which are incident on a region in a photodetector where the reflected light beams resulting from the reflection by the at least two recording layers interfere with each other. The light blocking region is not formed on an optical axis of the reflected light beam resulting from the reflection by the recording layer on which the blue light beam is focused.

17 Claims, 29 Drawing Sheets

U.S. PATENT DOCUMENTS

| | | |
|---|---|---|
| 2007/0189131 A1 | 8/2007 | Kuze et al. |
| 2007/0274188 A1 | 11/2007 | Kikuchi |
| 2008/0089205 A1* | 4/2008 | Okamoto et al. ............... 369/94 |
| 2008/0175110 A1 | 7/2008 | Yamasaki et al. |
| 2009/0303857 A1 | 12/2009 | Nakatani et al. |
| 2010/0103799 A1* | 4/2010 | Kawano et al. .......... 369/112.23 |
| 2010/0224767 A1* | 9/2010 | Kawano et al. ............... 250/216 |

FOREIGN PATENT DOCUMENTS

| | | |
|---|---|---|
| JP | 2008-269756 | 11/2008 |
| JP | 2009-158075 | 7/2009 |
| WO | 03/005352 | 1/2003 |
| WO | 2005/101392 | 10/2005 |
| WO | 2008/099706 | 8/2008 |

* cited by examiner

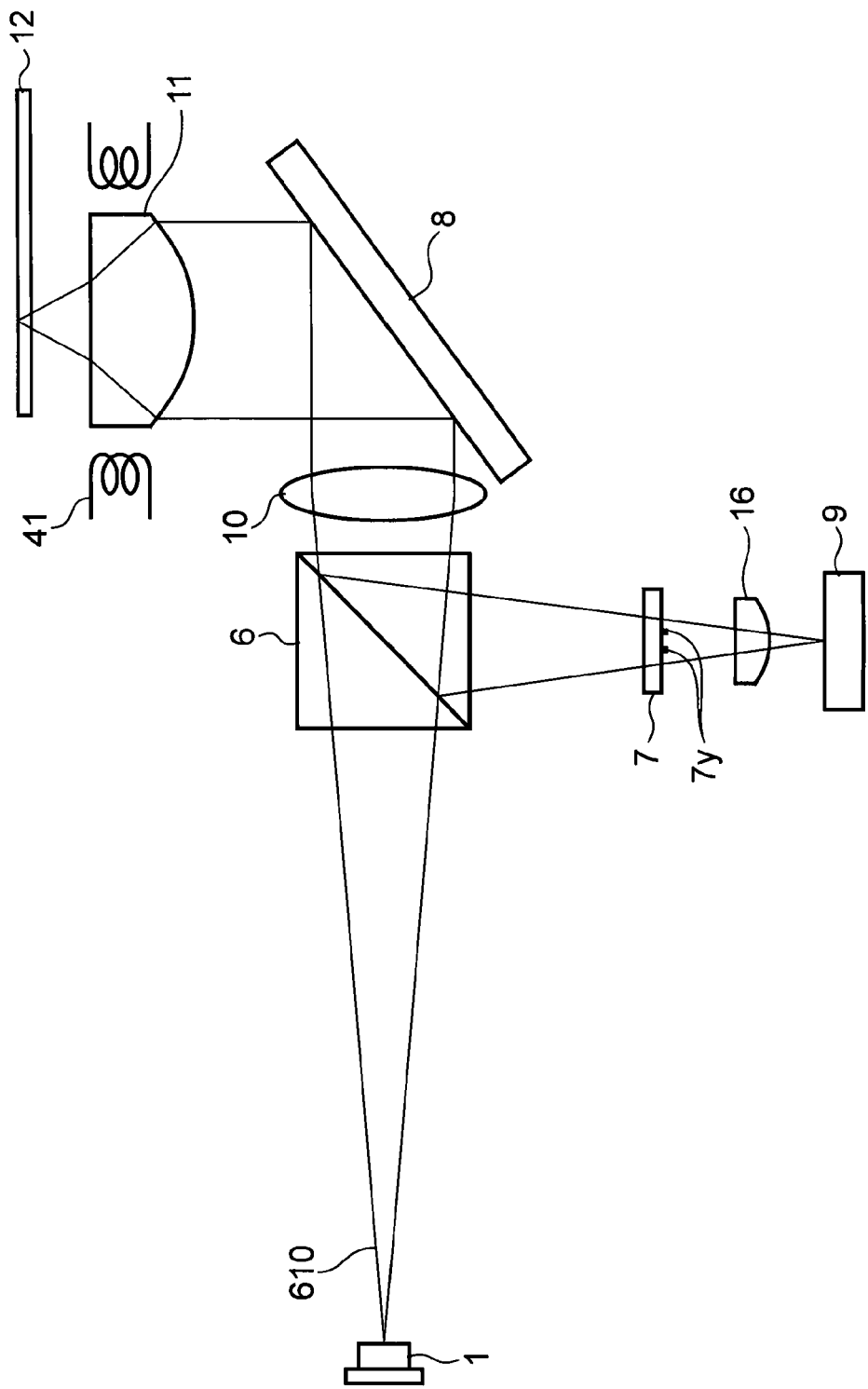

OPTICAL HEAD DEVICE, OPTICAL INFORMATION DEVICE AND INFORMATION PROCESSING DEVICE

TECHNICAL FIELD

The present invention relates to an optical head device which records, reproduces, or erases information on or from an optical information medium such as an optical disc, an optical information device including the optical head device, and an information processing device including the optical information device.

BACKGROUND ART

An optical memory technology using an optical disc having a pit-like pattern as a high-density and large-capacity storage medium has been practically used, while expanding its application to a digital audio disc, a video disc, and a document file disc and further to a data file. It is desired that the function, which is roughly sub-divided into a light focusing function which forms a minute spot of a diffraction limited size, a focus control (focus servo) function for an optical system, a tracking control function, and a pit signal (information signal) detecting function, is successfully performed with high reliability.

In recent years, due to the advancement of an optical system design technology and the achievement of a shorter wavelength of a semiconductor laser as a light source, the development of an optical disc having a storage capacity at a higher-than-ever density has advanced. As an approach to achieve a higher density, there is a method for increasing an optical-disc-side numerical aperture (NA) in a focusing optical system which converges a light beam to a minute spot on an optical disc. At this time, an increase in the amount of aberration produced by the inclination (so-called tilt) of an optical axis presents a problem. When the numerical aperture NA is increased, the amount of aberration produced by the tilt increases. To prevent this, it is appropriate to reduce the thickness of the substrate (base member thickness) of the optical disc.

In a compact disc (CD) which might be said to be a first generation optical disc, infrared light having a wavelength $\lambda 3$ (the wavelength $\lambda 3$ is 780 nm to 820 nm) and an objective lens having a numerical aperture NA of 0.45 are used, and the base member thickness of the optical disc is 1.2 mm. In a second generation DVD, red light having a wavelength $\lambda 2$ (the wavelength $\lambda 2$ is 630 nm to 680 nm, and a standard wavelength is 650 nm) and an objective lens having a numerical aperture NA of 0.6 is used, and the base member thickness of the optical disc is 0.6 mm. In a third generation optical disc, blue light having a wavelength $\lambda 1$ (the wavelength $\lambda 1$ is 390 nm to 415 nm, and a standard wavelength is 405 nm) and an objective lens having a numerical aperture NA of 0.85 is used, and the base member thickness of the optical disc is 0.1 mm. Note that, in the present specification, a thickness of a substrate (base member thickness) refers to a thickness from a surface of an optical disc (or optical information medium) on which a light beam is incident to a recording layer thereof on which information is recorded. Thus, the thickness of the substrate of the high-density optical disc has been reduced compared with the related art optical disc.

As another method for increasing the storage capacity of an optical disc, the number of recording layers is increased. Between the recording layers, an intermediate layer needs to be provided so as to prevent the occurrence of leak-in of information. However, a spherical aberration generated when the thickness from the top surface of the optical disc to the recording layer thereof changes from an expected value is proportional to approximately the fourth power of the numerical aperture. Therefore, when the numerical aperture is set high, it is undesirable to design thicken the intermediate layer. As a result of reducing the thickness of the intermediate layer, the leak-in of information (crosstalk) between the recording layers and interference by reflected light from each of the recording layers present a problem. One of countermeasures against the problem is disclosed in Patent Literature 1. Using FIG. 20, Patent Literature 1 will be briefly described as a related-art example.

FIG. 20 is a view showing a schematic configuration of an optical head of the related-art example. FIG. 21 is a view showing a schematic configuration of an optical disc of the related-art example. FIG. 22 is a view showing a schematic configuration of a detection hologram of the related-art example.

The optical head 500 includes a light source 501 which emits blue-violet laser light, a beam splitter 502, a collimator lens 503, an objective lens 504, a detection hologram 505, a detection lens 506, and a light receiving element 507 which receives laser light. An optical disc 508 includes three information recording layers. The optical head 500 not only records or reproduces information by causing the blue-violet laser light to pass through two types of base members having different thicknesses, but also records or reproduces information on or from the optical disc 508 having the plurality of information recording layers.

Using FIG. 20, a description will be given to an operation of the optical head 500 which records or reproduces information on or from the optical disc 508. The blue-violet laser light emitted from the light source 501 is transmitted by the beam splitter 502 and converted by the collimator lens 503 into generally parallel light to be incident on the objective lens 504. Then, the blue-violet laser light incident on the objective lens 504 is converged to a light spot onto any of the information recording layers of the optical disc 508 through a protective substrate.

The blue-violet laser light in a return path reflected by the information recording layer of the optical disc 508 follows the same optical path as followed in an outward path and is transmitted by the objective lens 504 and the collimator lens 503. The blue-violet laser light transmitted by the collimator lens 503 is reflected by the beam splitter 502, then divided by the detection hologram 505 for the detection of a servo signal, imparted with a predetermined astigmatism by the detection lens 506, and guided to the light receiving element 507. As a result, an information signal and the servo signal are generated.

A focus error signal for the optical disc 508 is generated using a so-called astigmatic method in which a focal spot imparted with an astigmatism by the detection lens 506 is detected with a quartered light receiving pattern in the light receiving element 507 or the like. A tracking error signal for the optical disc 508 is generated using a zero-order diffracted light beam and plus first-order diffracted light beams each generated by the detection hologram 505. The numerical aperture (NA) of the objective lens 504 is 0.85. The objective lens 504 is designed to be capable of forming a focal spot of a diffraction limited size onto any of the information recording layers provided in the optical disc 508 in which the thickness of a protective layer is about 0.1 mm.

As shown in FIG. 21, the optical disc 508 includes first to third information recording layers 511, 512, and 513 in which protective layers have mutually different thicknesses. Accordingly, when the focal spot is formed on, e.g., the second information recording layer 512 and information is recorded or reproduced on or from the second information recording layer 512, laser light is reflected also by each of the first and third information recording layers 511 and 513. The laser light beams are transmitted by the objective lens 504 and the collimator lens 503, and reflected by the beam splitter 502, similarly to the laser light (signal light) beam reflected by the second information recording layer 512. Then, the laser light beams reflected by the beam splitter 502 are transmitted by the detection hologram 505 and the detection lens 506, and guided to the light receiving element 507. The laser light beams reflected by the first and third information recording layers 511 and 513 other than the second information recording layer 512 on which the focal spot is formed and incident on the light receiving element 507 are called so-called stray light beams.

The detection hologram 505 has a light blocking region 505x as shown in FIG. 22. The light blocking region 505x is a circular region having a diameter D2. The light blocking region 505x is formed by, e.g., vapor depositing a metal film of aluminum or the like. The transmissivity of the light blocking region 505x is substantially zero.

FIG. 23 is a view schematically showing the optical path of the reflected light resulting from reflection by the first information recording layer 511 located on a side closer to a laser light incident surface, when information is recorded or reproduced on or from the second information recording layer 512 of the optical disc 508 using the optical head 500 of the related-art example. The laser light reflected by the first information recording layer 511 has the middle portion thereof blocked by the light blocking region 505x formed in the detection hologram 505 to be transmitted by the detection lens 506 and guided to the light receiving element 507. The laser light reflected from the first information recording layer 511 has light (light in the center portion thereof) including the optical axis of the laser light which is blocked by the light blocking region 505x, and does not enter a light receiving portion in the light receiving element 507.

FIG. 24 is a view schematically showing the optical path of the reflected light resulting from reflection by the third information recording layer 513 located on a side more distant from a laser light incident surface, when information is recorded or reproduced on or from the second information recording layer 512 of the optical disc 508 using the optical head 500 of the related-art example. The laser light reflected by the third information recording layer 513 also has light (light in the center portion thereof) including the optical axis of the laser light which is blocked by the light blocking region 505x, and does not enter the light receiving portion in the light receiving element 507.

As described above, the laser light (another layer reflected light) beams reflected by the first information recording layer 511 and the third information recording layer 513 are prevented by the light blocking region 505x from entering the light receiving portions in the light receiving element 507. Therefore, the laser light beams reflected by the first information recording layer 511 and the third information recording layer 513 do not overlap the laser light beam reflected by the second information recording layer 512 as the target of information recording or reproduction. As a result, fluctuations in the amount of the detected laser light beam reflected by the second information recording layer 512 are suppressed, and stabilization of the servo signal and the information signal can be achieved.

The related art example discloses the light blocking region including the optical axis as a means for avoiding leak-in of information (crosstalk) between the individual information recording layers and interference between the reflected light beams from the individual information recording layers in the case of further increasing the number of multiple layers in an ultra-high-density optical disc. However, to prevent the laser light beams reflected by the first information recording layer 511 and the third information recording layer 513 from entering the light receiving portions, the area of the light blocking region should be increased or the magnification of a signal detection optical system should be increased.

However, as the area of the light blocking region is increased, the blocked range of the signal light beam for obtaining the information signal increases to undesirably reduce the amount of the signal light beam. The magnification of the signal detection optical system mentioned above is the ratio of a focal distance fd for focusing the laser light beam toward the light receiving element (or photodetector) to a focal distance f0 for focusing the laser light beam toward the optical disc by means of the objective lens, i.e., fd/f0. To increase the ratio fd/f0, the focal distance fd may be increased appropriately but, when the foal distance fd is increased, the problem of an increased device size occurs.

The ratio fd/f0 can also be increased by reducing the focal distance f0, but the effective diameter of the objective lens is also reduced. Here, the objective lens needs to be moved in a direction perpendicular to the optical axis so as to follow the eccentricity of the optical disc. However, when the effective diameter of the objective lens is reduced, the problem arises that the amount of movement of the map of the effective diameter of the objective lens over the light receiving element increases to degrade a control signal. In either case, it is not preferable to increase the ratio fd/f0.

FIG. 25 is a view schematically showing a light spot formed on the light receiving portions of the related art optical head. As a measure to reduce the problem described above, a method can be considered in which, as shown in FIG. 25, an another layer light beam 320 which is a reflected light beam from another information recording layer is not prevented from entering light receiving portions 309a to 309d, but the another layer light beam 320 is incident on the light receiving portions 309a to 309d and blocked so as not to overlap a signal light beam 321. This allows the magnification fd/f0 of the signal detection optical system to be reduced to a value lower than in an optical head which satisfies the condition that reflected light from another information recording layer does not enter a light receiving region. Note that a reflected light beam from an information recording layer other than the information recording layer on which a laser light beam is focused to a light spot for the reproduction or recording of information is called an "another layer light beam".

However, the problem reducing measure has another problem. FIG. 26 is a view showing reflected light beams from three information recording layers included in an optical disc when a laser light beam is focused on the third information recording layer. FIG. 27 is a view schematically showing the light spot of each of reflected light beams from the second and third information recording layers, which is formed on the light receiving portions when the laser light beam is focused on the third information recording layer shown in FIG. 26. FIG. 28 is a view schematically showing the light spot of each of reflected light beams from the first and third information recording layers, which is formed on the light receiving portions when the laser light beam is focused on the third information recording layer shown in FIG. 26.

For example, when the laser light is focused on the third information recording layer 513 in FIG. 26, reflected light beams are also generated from the second information recording layer 512 and the first information recording layer 511. As shown in FIG. 27, an another layer light beam 420 reflected by the second information recording layer 512 has light in the vicinity of the optical axis thereof which is blocked and therefore does not overlap a signal light beam 421 reflected by the third information recording layer 513. This is similar to the another layer light beam 320 from another information recording layer shown in FIG. 25.

As also shown in FIG. 28, an another layer light beam 520 reflected by the first information recording layer 511 expands to be larger over the light receiving surface of the light receiving element since the distance between the third information recording layer 513 and the first information recording layer 511 is larger than the distance between the third information recording layer 513 and the second information recording layer 512. As a result, the another layer light beam 520 reflected by the first information recording layer 511 does not overlap the signal light beam 421 reflected by the third information recording layer 513. However, there remains the possibility of a new problem that the another layer light beam 420 reflected by the second information recording layer 512 and the another layer light beam 520 reflected by the first information recording layer 511 overlap to interfere with each other. The mechanism of the interference will be described using FIG. 29.

FIG. 29 is a view schematically showing the light spot of each of the reflected light beams from the first to third information recording layers, which is formed on the light receiving portions when the laser light beam is focused on the third information recording layer shown in FIG. 26.

As described previously, the provision of the light blocking region in the vicinity of the optical axis can reduce mutual interference between the signal light beam 421 and the another layer light beams 420 and 520. In addition, in a region 430 (horizontally hatched portion) where only the another layer light beam 420 reflected by the second information recording layer 512 is present, the another layer light beam 520 is not present so that interference between the another layer light beam 520 and the another layer light beam 420 does not occur. What presents a problem is a region (portion hatched with left downwardly inclined lines) outside the region 430. In the region outside the region 430, the another layer light beam 420 reflected by the second information recording layer 512 and the another layer light beam 520 reflected by the first information recording layer 511 overlap so that interference occurs therebetween. If the another layer light beam 420 and the another layer light beam 520 overlap on the light receiving portions 309a, 309b, 309c, and 309d, when a change in the spacing between the first information recording layer 511 and the second information recording layer 512 or the like causes a fluctuation in the state of the interference, the signal light beam 421 may be affected by the interference to deteriorate and degrade the S/N ratio of the signal outputted from the light receiving portions.

This problem may possibly occur when an optical information medium on or from which an optical head is to reproduce or record information has three or more information recording layers. Preferably, particular attention is given to the case where there are two or more information recording layers on at least one of the side of the information recording layer on which the laser light beam is focused which is closer to the laser light incident surface and the side thereof more distant from the laser light incident surface.

If consideration is given to the case where the laser light is focused on the third information recording layer 513 and the another layer light beams are generated from the second information recording layer 512 and the first information recording layer 511, the phases of the wavefronts of the another layer light beam from the second information recording layer 512 and the first information recording layer 511 are close to each other. As a result, the intensity difference between the interference fringes of the two another layer light beams becomes relatively large to exert particularly large influence when the interfering light beams are incident on the light receiving portions.

CITATION LIST

Patent Literature
    Patent Literature 1: Japanese Patent Application Laid-open No. 2008-198336

SUMMARY OF INVENTION

The present invention has been achieved in order to solve the problems mentioned above, and an object thereof is to provide an optical head device, an optical information device, and an information processing device which allow an improvement in the S/N ratio of a signal outputted from a photodetector.

An optical head device according to an aspect of the present invention is an optical head device which records or reproduces information on or from a first optical information medium having three or more recording layers, including: a first laser light source which emits a first light beam; a focusing optical system which focuses the first light beam emitted from the first laser light source onto one of the recording layers of the first optical information medium; a photodetector which receives the first light beam reflected by the recording layer of the first optical information medium and outputs an electric signal in accordance with an amount of the received first light beam; and a first light blocking region disposed on a light flux of the reflected light beam resulting from the reflection by the recording layer on which the first light beam is focused, to block, when there are at least two recording layers on a first light beam incident side of the recording layer on which the first light beam is focused or on a side thereof opposite to the first light beam incident side, reflected light beams resulting from reflection by the at least two recording layers which are incident on a region in the photodetector where the reflected light beams resulting from the reflection by the at least two recording layers interfere with each other, wherein the first light blocking region is not formed on an optical axis of the reflected light beam resulting from the reflection by the recording layer on which the first light beam is focused.

According to this configuration, the first laser light source emits the first light beam. The focusing optical system focuses the first light beam emitted from the first laser light source onto one of the recording layers of the first optical information medium. The photodetector receives the first light beam reflected by the recording layer of the first optical information medium, and outputs the electric signal in accordance with the amount of the received first light beam. The first light blocking region is disposed on the light flux of the reflected light resulting from the reflection by the recording layer on which the first light beam is focused, to block, when there are at least two recording layers on the first light beam incident side of the recording layer on which the first light beam is focused or on the side thereof opposite to the first light beam incident side, the reflected light beams resulting from the reflection by the at least two recording layers which are incident on the region in the photodetector where the reflected light beams resulting from the reflection by the at least two recording layers interfere with each other. Note that the first light blocking region is not formed on the optical axis of the reflected light beam resulting from the reflection by the recording layer on which the first light beam is focused.

According to the present invention, it is possible to reduce mutual interference between the reflected light beams resulting from the reflection by the at least two recording layers which are present on the first light beam incident side of the recording layer on which the first light beam is focused or on the side thereof opposite to the first light beam incident side, and improve the S/N ratio of a signal outputted from the photodetector.

Other objects, features, and excellent aspects of the present invention will become apparent from the following description taken with the accompanying drawings.

BRIEF DESCRIPTION OF DRAWINGS

FIG. 1 is a view showing a configuration of an optical head device in the embodiment of the present invention.

DESCRIPTION OF EMBODIMENTS

Figure 2A:
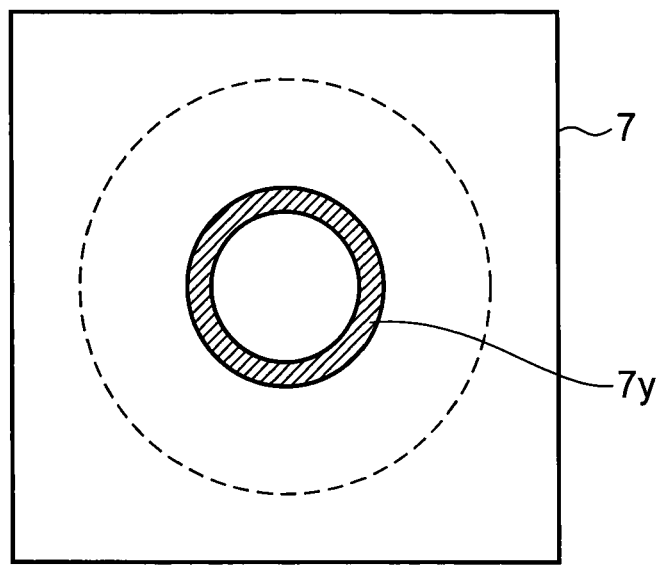
FIG. 2A is a top view showing a configuration of a detection hologram in first embodiment of the present invention.

Referring now to the accompanying drawings, embodiments of the present invention will be described below. Note that each of the following embodiments is an example in which the present invention is embodied, and is not intended by nature to limit the technical scope of the present invention.

(First Embodiment)

FIG. 1 is a view showing a configuration of an optical head device in first embodiment of the present invention. In FIG. 1, the optical head device includes a laser light source 1, a beam splitter 6, a detection hologram (diffractive optical element) 7, a standing mirror 8, a photodetector 9, a collimator lens 10, an objective lens 11, a detection lens 16 and an objective lens actuator 41.

The laser light source 1 emits laser light (blue light) at a wavelength λ1 (ranging from 390 nm to 415 nm but, since about 405 nm is normally used in most cases, a wavelength ranging from 390 nm to 415 nm is generally referred to as a wavelength of about 405 nm). The collimator lens 10 converts a laser light beam to generally parallel light. The standing mirror 8 bends an optical axis. The objective lens 11 focuses the blue light beam emitted from the laser light source 1 onto an information recording layer of an optical disc 12 through a base member having a thickness t1.

The objective lens actuator 41 moves the objective lens 11 in an optical axis direction and in a disc radial direction. The objective lens actuator 41 also causes the objective lens 11 to follow the surface deflection and eccentricity of the optical discs.

The optical disc 12 is a third generation optical disc which has the base member thickness t1 of about 0.1 mm (hereinbelow, a base member thickness ranging from 0.05 mm to 0.11 mm will be referred to as a base member thickness of about 0.1 mm) or less than 0.1 mm and on or from which information is recorded or reproduced using a light beam at the wavelength λ1. In FIG. 1, of the optical disc 12, only the base members from the light incident surfaces thereof to the information recording layers thereof are shown. In an actual situation, each of the base members is bonded to a protective plate (or protective member) to have an enhanced mechanical strength and an outer diameter of 1.2 mm, which is the same as the outer diameter of a CD. The optical disc 12 is bonded to a protective member having a thickness of, for example, 1.1 mm. In FIG. 1, the protective members are omitted for the sake of clear illustration. The optical disc 12 has three information recording layers, similarly to the optical disc 508 shown in FIG. 26.

Preferably, the laser light source 1 is formed of a semiconductor laser light source. This can reduce the size, weight, and power consumption of the optical head device and those of an optical information device using the optical head device.

The detection hologram 7 diffracts the blue light beam reflected by one of the information recording layers of the optical disc 12. A light blocking region 7y is disposed on the light flux of the reflected light beam resulting from the reflection by the information recording layer on which the blue light beam is focused. When there are at least two information recording layers on the blue light beam incident side of the information recording layer on which the blue light beam is focused or on the side thereof opposite to the blue light beam incident side, the light blocking region 7y blocks reflected light beams resulting from reflection by the at least two information recording layers which are incident on a region in the photodetector 9 where the reflected light beams resulting from the reflection by the at least two information recording layers interfere with each other. The light blocking region 7y is formed on the detection hologram 7 which diffracts the reflected light beam resulting from the reflection by the information recording layer on which the blue light beam is focused. Note that the details of the detection hologram 7 will be described later.

The detection lens 16 converges the blue light beam reflected by the information recording layer of the optical disc 12 onto the photodetector 9. The photodetector 9 receives the blue light beam reflected by the information recording layer of the optical disc 12, and outputs an electric signal in accordance with the amount of the received blue light beam.

When information is recorded or reproduced on or from the optical disc 12, a blue light beam 610 at the wavelength λ1 emitted from the laser light source 1 is transmitted by the beam splitter 6 and converted by the collimator lens 10 to generally parallel light. The blue light beam 610 converted to the generally parallel light has the optical axis thereof bent by the standing mirror 8 and is focused by the objective lens 11 onto the information recording layer through the base member of the optical disc 12 having a thickness of about 0.1 mm.

The blue light beam 610 reflected by the information recording layer reversely follows the previously followed optical path and is transmitted by the objective lens 11. The blue light beam 610 transmitted by the objective lens 11 is reflected by the beam splitter 6 and has a part thereof diffracted by the detection hologram 7. The blue light beam 610 having the part thereof diffracted by the detection hologram 7 is imparted with a predetermined astigmatism together with undiffracted transmitted light by the detection lens 16 to be incident on the photodetector 9. Through an arithmetic operation of an output of the photodetector 9, a servo signal used for focal control and tracking control and an information signal are obtained.

Note that it may also be possible to interchange the positions of the laser light source 1 and the optical components of a signal detection optical system including the detection hologram 7 and the photodetector 9, and interchange, e.g., the functions of transmission and reflection by the beam splitter 6 in an outward path and a return path. The optical head device of the present invention is not limited to the configuration of the optical system shown in FIG. 1.

Next, using FIGS. 2A and 2B, a description will be given to the function and configuration of the light blocking region provided on the detection hologram 7. FIG. 2A is a top view showing the configuration of the detection hologram in first embodiment of the present invention, and FIG. 2B is a cross-sectional view of the detection hologram shown in FIG. 2A.

The detection hologram 7 of the present embodiment includes at least the light blocking region 7y, as shown in FIG. 2A. The light blocking region 7y is, e.g., a doughnut-like region. Here, the doughnut-like shape means a shape in which the light blocking region 7y is not formed in an area including the optical axis of a signal light beam. That is, the light blocking region 7y is not formed on the optical axis of the reflected light beam resulting from the reflection by the information recording layer on which the blue light beam is focused. Also, the outer edge of the light blocking region 7y is closer to the optical axis than the outer edge of the effective light flux of the reflected light beam resulting from the reflection by the information recording layer on which the blue light beam is focused. The broken line shown in FIG. 2A shows an effective light flux diameter when information is recorded or reproduced on or from the optical disc 12. The blue light beam 610 passes through the inside of the effective light flux diameter. The light blocking region 7y is a region smaller than the effective light flux diameter shown by the broken line.

Figure 2B:
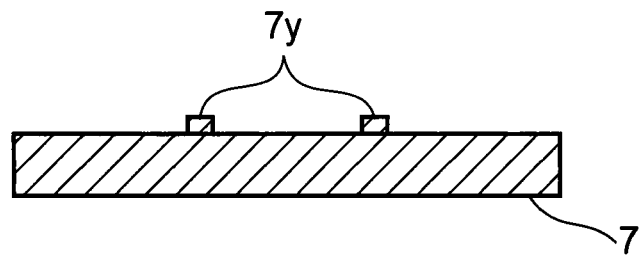
FIG. 2B is a cross-sectional view of the detection hologram shown in FIG. 2A.

For example, as shown in FIG. 2B, the light blocking region 7y is formed by vapor depositing a dielectric film on the surface of the detection hologram 7, and has a substantially zero transmissivity to the blue light beam at the wavelength λ1. The light blocking region 7y is a light blocking film. Preferably, the transmissivity of the light blocking region 7y to the blue light beam at the wavelength λ1 is close to zero. However, even if the transmissivity of the light blocking region 7y to the blue light beam at the wavelength λ1 is about several percent (e.g., 10%), substantially the same effect as obtained when the transmissivity is zero can be obtained. In the present specification, if the transmissivity is not more than 10%, it is stated that the transmissivity is "approximately 0%".

The light blocking region is not necessarily disposed on the detection hologram 7, and it may be possible to dispose the light blocking region at any position in a return optical path. However, by forming the light blocking region on the detection hologram 7, it is possible to measure an amount of diffracted light from the detection hologram 7 and align the position of the optical axis with that of the center of the light blocking region. As a result, the effect of reducing interference by the another layer light achieved by blocking light can be enhanced.

Note that, in the present embodiment, the optical disc 12 corresponds to an example of a first optical information medium or an optical information medium, the laser light source 1 corresponds to an example of a first laser light source or a laser light source, the objective lens 11 corresponds to an example of a focusing optical system, the photodetector 9 corresponds to an example of a photodetector, the light blocking region 7y corresponds to an example of a first light blocking region or a light blocking region, and the detection hologram 7 corresponds to an example of a diffractive optical element.

Figure 3:
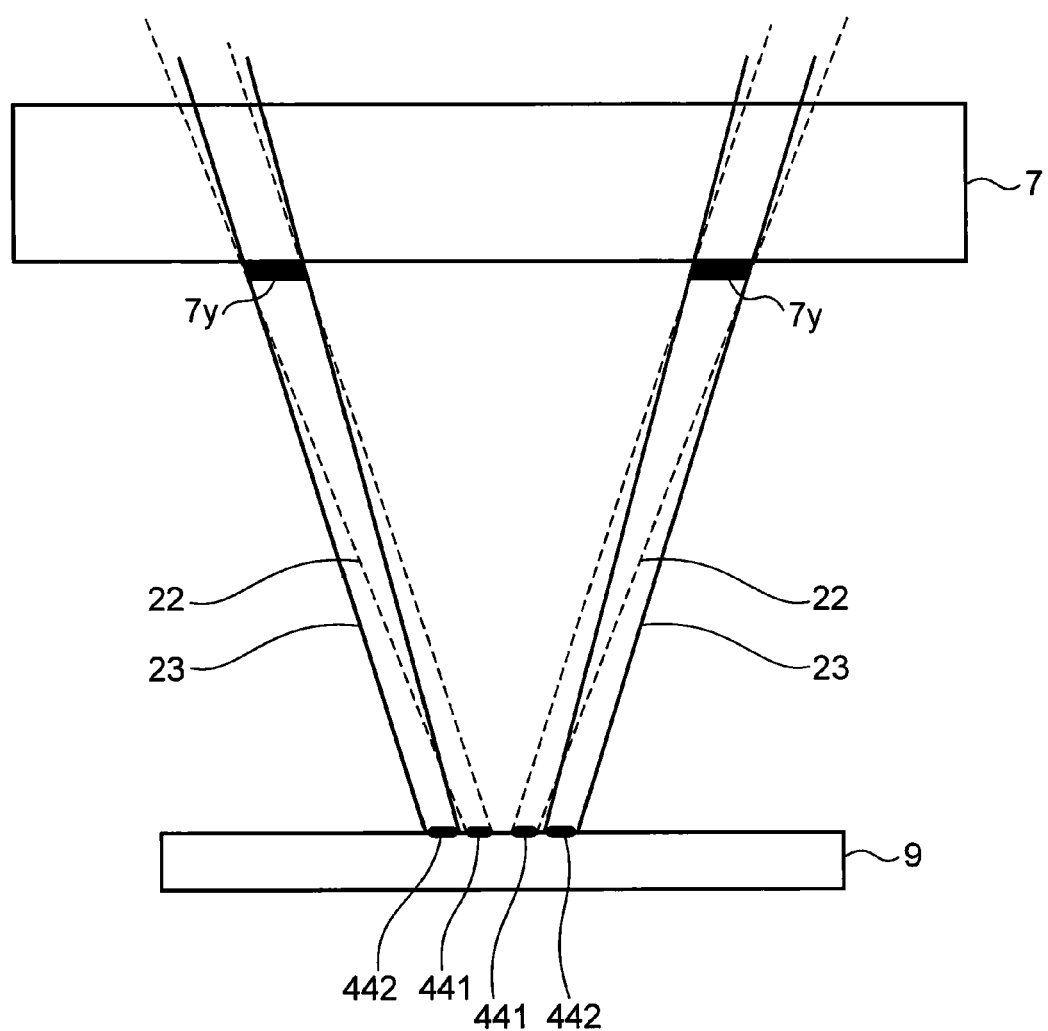
FIG. 3 is a schematic illustrative view of the vicinities of the detection hologram and a photodetector when information is reproduced from an optical disc having a plurality of information recording layers.

FIG. 3 is a schematic illustrative view of the vicinities of the detection hologram 7 and the photodetector 9 when information is reproduced from the optical disc 12 having the plurality of information recording layers. Note that, in FIG. 3, the detection lens 16 disposed between the detection hologram 7 and the photodetector 9 is omitted. It is assumed that the information recording layer on which the blue light beam 610 (not shown in FIG. 3) is converged by the objective lens to reproduce information is called a main recording layer and another information recording layer other than the main recording layer is called another layer.

FIG. 3 shows an example of stray light beams reflected from the two another layers located on a side closer to the objective lens than the main recording layer and incident on the photodetector side. Shadows 22 shown by the broken lines represent shadows of the another layer light beam 420 from the second information recording layer 512 when the blue light beam is focused on the third information recording layer 513 of FIG. 26. Shadows 23 shown by the solid lines represent shadows of the another layer light beam 520 from the first information recording layer 511 when the blue light beam is focused on the third information recording layer 513 of FIG. 26.

Figure 26:
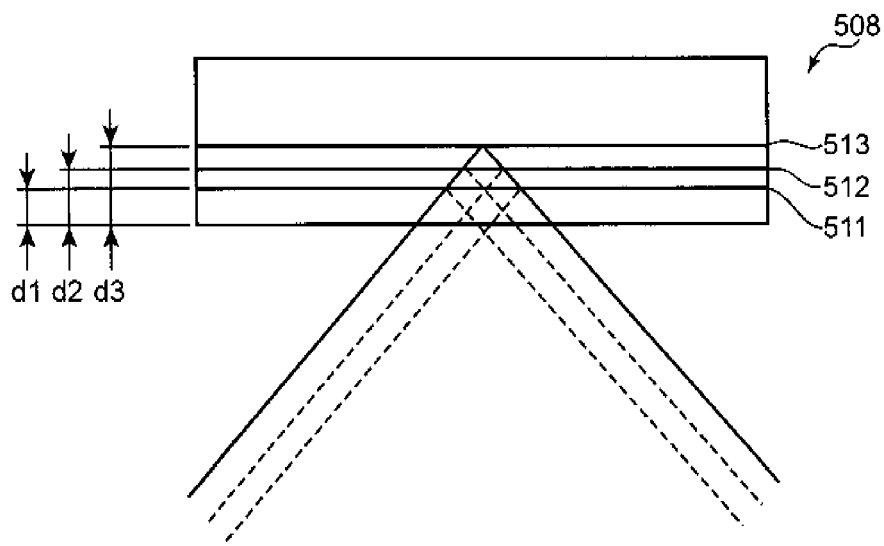
FIG. 26 is a view showing reflected light beams from three information recording layers included in an optical disc when a laser light beam is focused on the third information recording layer.
Figure 27:
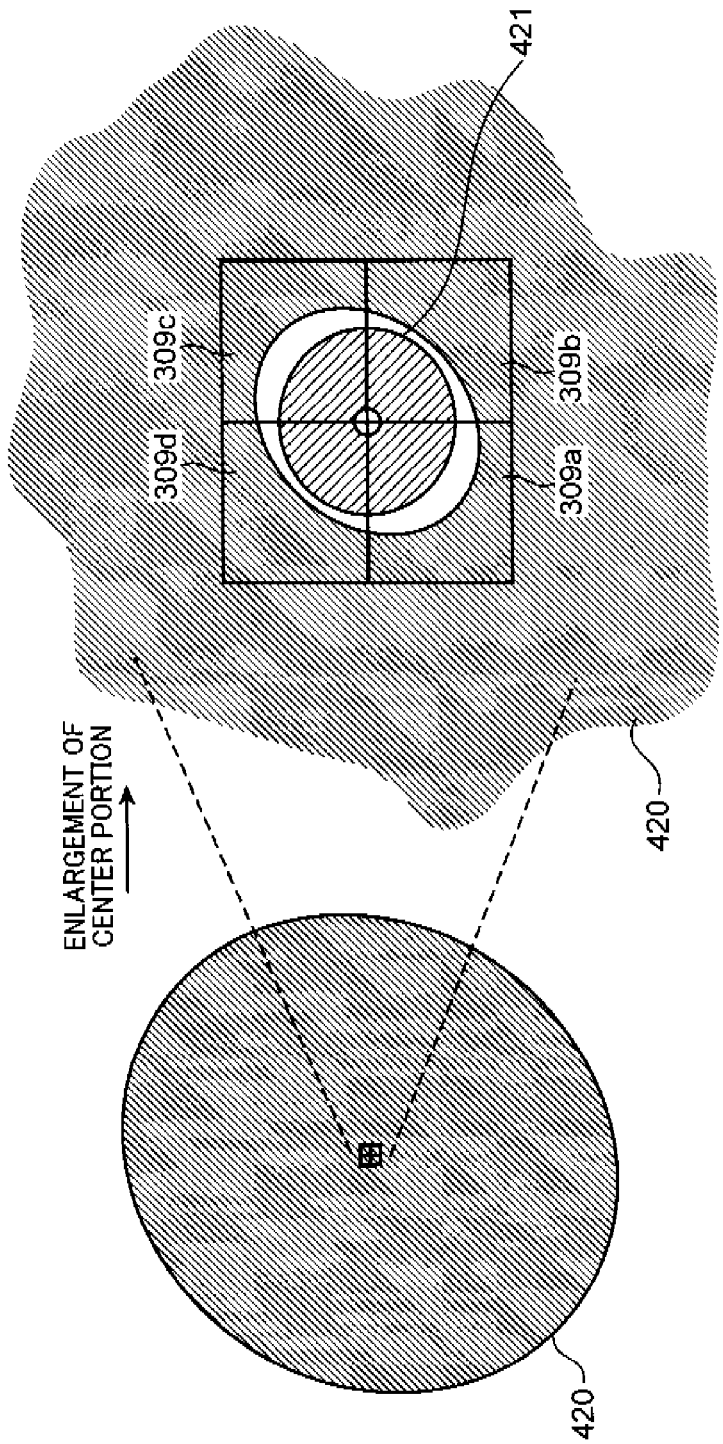
FIG. 27 is a view schematically showing the light spot of each of reflected light beams from the second and third information recording layers, which is formed on the light receiving portions when the laser light beam is focused on the third information recording layer shown in FIG. 26.
Figure 28:
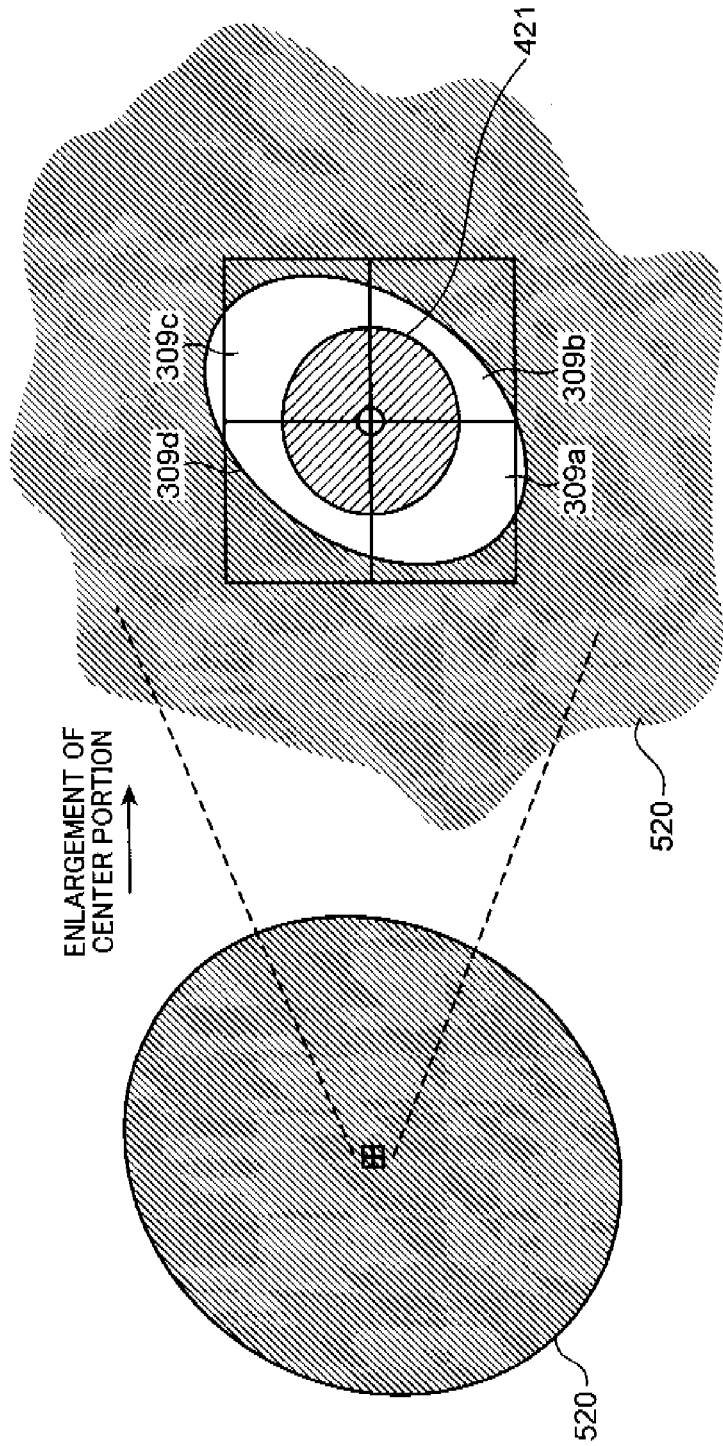
FIG. 28 is a view schematically showing the light spot of each of reflected light beams from the first and third information recording layers, which is formed on the light receiving portions when the laser light beam is focused on the third information recording layer shown in FIG. 26.
Figure 29:
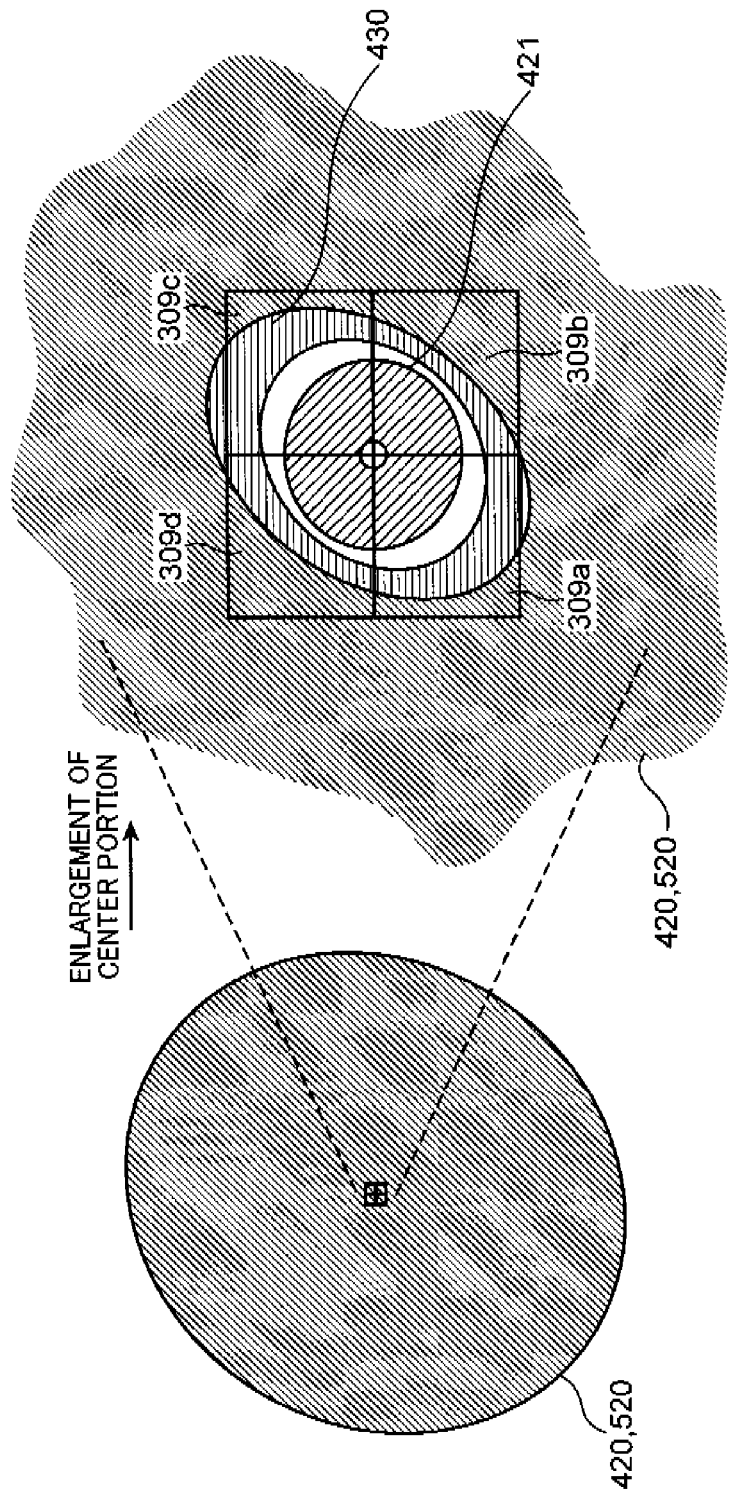
FIG. 29 is a view schematically showing the light spot of each of the reflected light beams from the first to third information recording layers, which is formed on the light receiving portions when the laser light beam is focused on the third information recording layer shown in FIG. 26.

For example, when the main recording layer is the third information recording layer 513 of FIG. 26 and the another layers are the first and second information recording layers 511 and 512, the first information recording layer 511 is more distant from the third information recording layer (main recording layer) 513 than the second information recording layer 512. Accordingly, when the blue light beam is converged on the third information recording layer 513, the another layer light beam 520 reflected by the first information recording layer 511 undergoes a larger focus shift at the light receiving surface of the photodetector 9 than that undergone by the another layer light beam 420 reflected by the second information recording layer 512. Therefore, in FIG. 3, each of the shadows 22 is a shadow of the another layer light beam 420 reflected by the second information recording layer 512 and having a part thereof blocked by the light blocking region 7y, and each of the shadows 23 is a shadow of the another layer light beam 520 reflected by the first information recording layer 511 and having a part thereof blocked by the light blocking region 7y.

The projections of the another layer light beam 420 formed by the light blocking region 7y on the photodetector 9 are shadows 441, and the projections of the another layer light beam 520 formed by the light blocking region 7y on the photodetector 9 are shadows 442. Here, the focus shift of the another layer light beam 420 is different from that of the another layer light beam 520 so that the shadows 441 and 442 are formed at different positions on the light receiving surface of the photodetector 9. The shadows 441 and 442 viewed in an optical axis direction, i.e., from above FIG. 3, are shown in FIG. 4.

Figure 4:
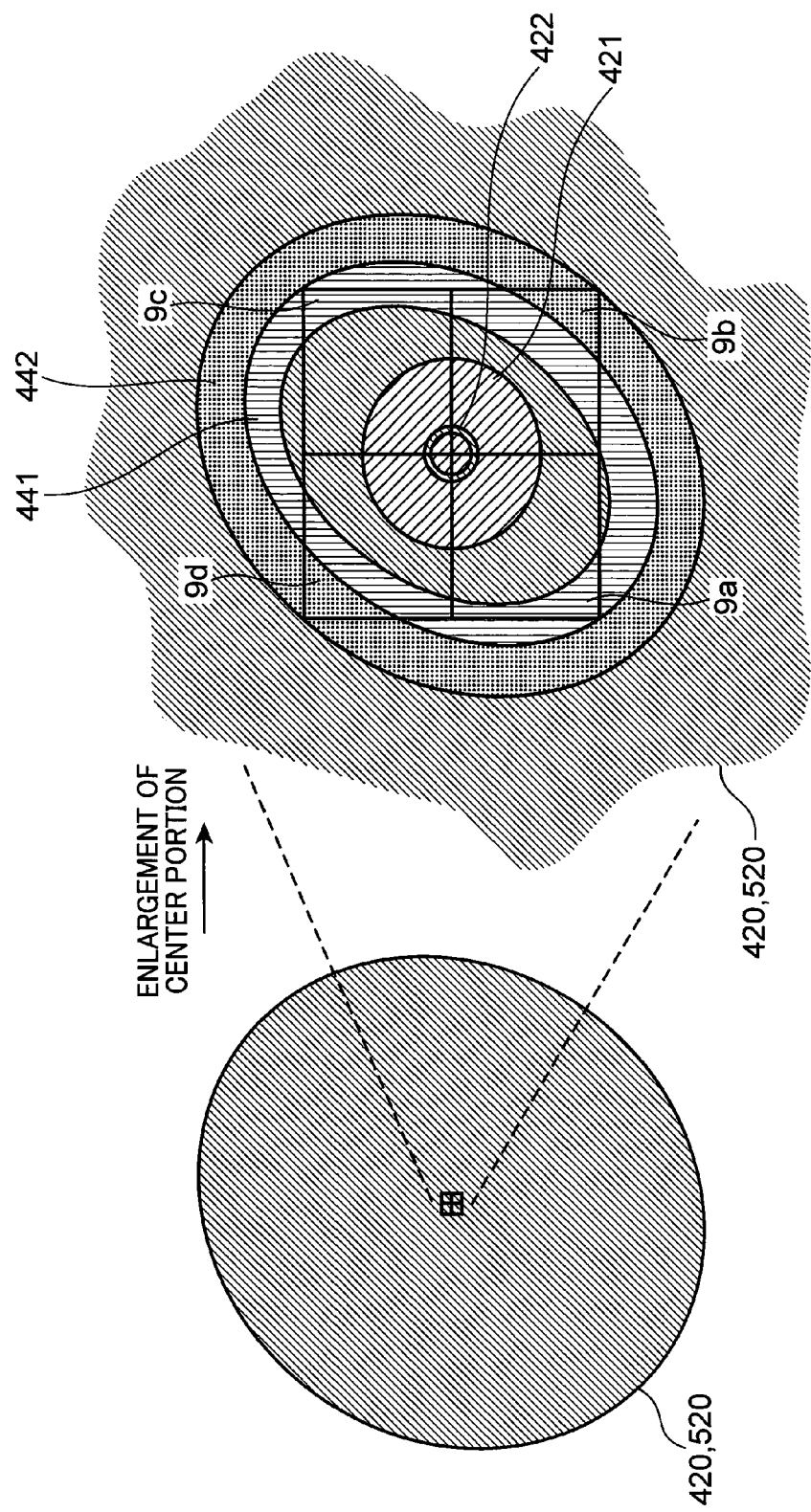
FIG. 4 is a view schematically showing a spot of light transmitted by the detection hologram including a light blocking region, which has been formed on the photodetector.

FIG. 4 is a view schematically showing a spot of light transmitted by the detection hologram 7 including the light blocking region 7y, which has been formed on the photodetector 9. The left drawing of FIG. 4 shows an external view of the light spot formed by the reflected light (stray light) beam from the another layer, and the right drawing of FIG. 4 shows an enlarged view of the center portion of the photodetector 9.

The another layer light beams 420 and 520 are examples of the stray light beam reflected from another layer and incident on the photodetector 9, and the signal light beam 421 is a light beam reflected from the main recording layer and incident on the photodetector 9. The photodetector 9 has the four light receiving portions 9a, 9b, 9c, and 9d which receive the blue light beam reflected by the information recording layers of the optical disc 12.

By the light blocking region 7y, the annular belt-like shadows 441 and 442 surrounding the optical axes of the another layer light beams are formed. As shown in the right drawing of FIG. 4, the annular belt-like shadows 441 and 442 occupy different positions on the light receiving surface. That is, the shadow 441 is not reached by the another layer light beam 420, but is reached only by the another layer light beam 520. On the other hand, the shadow 442 is not reached by the another layer light beam 520, but is reached only by the another layer light beam 420.

Thus, each of the regions where the shadows 441 and 442 are formed is reached by either one of the another layer light beam 420 and the another layer light beam 520 so that interference between the another layer light beams does not occur. If the ring-shaped light blocking region 7y is provided at a midpoint in the optical path reaching the photodetector 9, it is possible to prevent the occurrence of the interference in two regions (e.g., the shadows 441 and 442) formed by the ring-shape light blocking region 7y.

On the other hand, the shadow 422 is formed also in the signal light beam 421 (portion hatched with right downwardly inclined lines of FIG. 4), and the portion of the signal light beam 421 corresponding to the shadow 422 is missing, but only one shadow is formed by the ring-shaped light blocking region 7y. That is, by only causing the missing of the signal light beam resulting from the shadow corresponding to one ring-shaped light blocking region 7y, it is possible to reduce the interference in the interfering portions of the another layer light beams by means of the shadow corresponding to two ring-shaped light blocking regions 7y. Therefore, it is possible to more effectively reduce the influence of the interference, while further suppressing an amount of reduction in the intensity of the signal light beam.

Note that, as shown in FIGS. 1 to 4, by the formation of the light blocking region 7y which does not entail overlap between the annular ring-shaped shadows 441 and 442 on the photodetector 9, it is possible to obtain the effect of allowing a remarkable reduction in the influence of the interference, while minimizing a reduction in signal intensity.

As an example of the shape of the light blocking region 7y in the present embodiment, a ring shape is shown. However, even when the light blocking region 7y is formed in a polygonal shape such as a hexagon having a hole formed in the center portion thereof or an ellipsoidal shape having a hole formed in the center portion thereof, the same effect can be obtained.

The light blocking region 7y need not necessarily be formed in a shape having a closed outer edge portion. If the light spot is placed as in the right drawing of FIG. 4, the right upper and right lower portions of the shadows 441 and 442 are located in protruding relation to the outside of the light receiving portions 9c and 9a. Therefore, it may also be possible that the right upper and right lower portions of the shadows 441 and 442 need not be shielded from light. If the light blocking region 7y is formed in a ring shape lacking a part of the circular ring thereof, such as, e.g., a letter C shape or parenthesis (bracket) shape, it is also possible to further reduce the amount of the blocked signal light beam without degrading the light blocking effect. That is, the light blocking region 7y may also have a ring shape having at least one lacking portion. The light blocking region 7y is also a region surrounding the optical axes of the reflected light beams resulting from the reflection by the information recording layer on which the blue light beam is focused.

Note that, in the present embodiment, the light blocking region 7y is formed such that the respective optical axes of the another layer light beam 420 and the another layer light beam 520 each incident on the light blocking region 7y do not overlap on the photodetector 9. However, it may also be possible to dispose the light blocking region 7y such that the respective optical axes of the another layer light beams 420 and 520 partly overlap each other on the photodetector 9. It will be appreciated that, in this case also, the effect of reducing the interference between the another layer light beam 420 and the another layer light beam 520 is achieved.

In first embodiment, when the laser light beam is focused on the third information recording layer 513 most distant from the laser light incident surface, the light blocking region 7y is formed at a position where each of the reflected light beams from the first and second information recording layers 511 and 512 located closer to the incident surface than the third information recording layer 513 is incident. However, the optical disc 12 may also have fourth or more information recording layers.

For example, in the case where the laser light beam is caused to be incident on the optical disc 12 having the four or more information recording layers, due to the relations among the respective thicknesses of individual intermediate layers, when the laser light beam is focused on the information recording layer located at the third position from the laser light incident surface, interfering light beams formed by the another layer light beams from the two information recording layers located at the first and second positions from the laser light incident surface are most likely to affect the signal light beam. Therefore, when the laser light beam is focused on the information recording layer located at the third position from the laser light incident surface, by the formation of the light blocking region 7y in the region where the another layer light beams from the two information recording layers located at the first and second positions from the laser light incident surface overlap each other, the influence of the interfering light beams can be most effectively reduced.

(Second Embodiment)

Figure 5A:
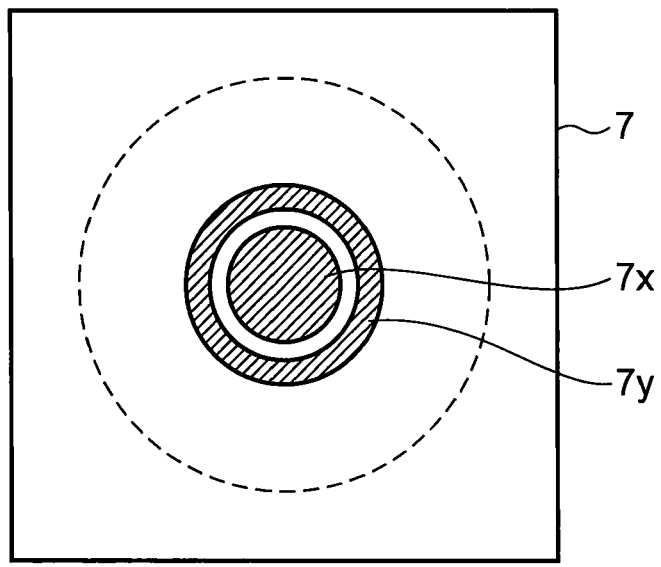
FIG. 5A is a top view showing a configuration of a detection hologram in second embodiment of the present invention.
Figure 5B:
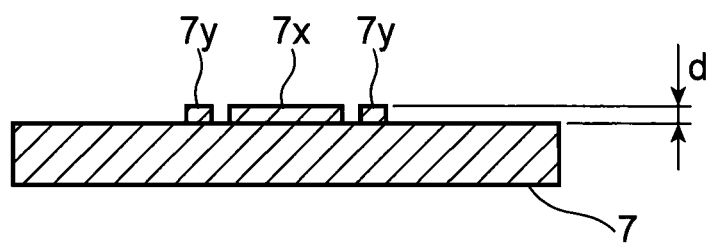
FIG. 5B is a cross-sectional view of the detection hologram shown in FIG. 5A.

FIG. 5A is a top view showing a configuration of a detection hologram in second embodiment of the present invention, and FIG. 5B is a cross-sectional view of the detection hologram shown in FIG. 5A. For example, the detection hologram 7 shown in FIGS. 5A and 5B is the detection hologram 7 included in the optical head device of FIG. 1. Note that, since a configuration of an optical head device in second embodiment is the same as the configuration of the optical head device in first embodiment, a description thereof is omitted. second embodiment is different from first embodiment in the light blocking region formed in the detection hologram. The light blocking region 7y has the same configuration as that of the light blocking region 7y described in first embodiment and achieves the same effect as achieved thereby. In second embodiment, a description will be given to a configuration in which, on the side of the light blocking region 7y closer to the optical axis center of the signal light beam, a light blocking region 7x is further provided.

The light blocking region 7x is disposed on the center point of a reflected light beam resulting from reflection by the information recording layer on which the blue light beam is focused, to block the blue light beam. The light blocking region 7x is disposed inwardly of the light blocking region 7y. The light blocking region 7x is formed on the detection hologram 7 which diffracts the reflected light beam resulting from the reflection by the information recording layer on which the blue light beam is focused.

The light blocking region 7x is, e.g., a circular region around the center point of the reflected light beam resulting from the reflection by the information recording layer on which the blue light beam is focused. The light blocking region 7x may also have a polygonal or ellipsoidal shape. The broken line shown in FIG. 5A shows an effective light flux diameter when information is recorded or reproduced on or from the optical disc 12. The light blocking region 7x is a region remarkably smaller than the effective light flux diameter shown by the broken line. For example, as shown in FIG. 5B, the light blocking region 7x is formed by vapor depositing a dielectric film on the surface of the detection hologram 7, and has a substantially zero transmissivity to the blue light beam at the wavelength λ1. The light blocking region 7x is a light blocking film. Preferably, the transmissivity of the light blocking region 7x to the blue light beam at the wavelength λ1 is close to zero. However, even if the transmissivity of the light blocking region 7x to the blue light beam at the wavelength λ1 is about several percent (e.g., 10%), substantially the same effect can be obtained. In the present specification, if the transmissivity is not more than 10%, it is stated that the transmissivity is "approximately 0%".

Figure 6:
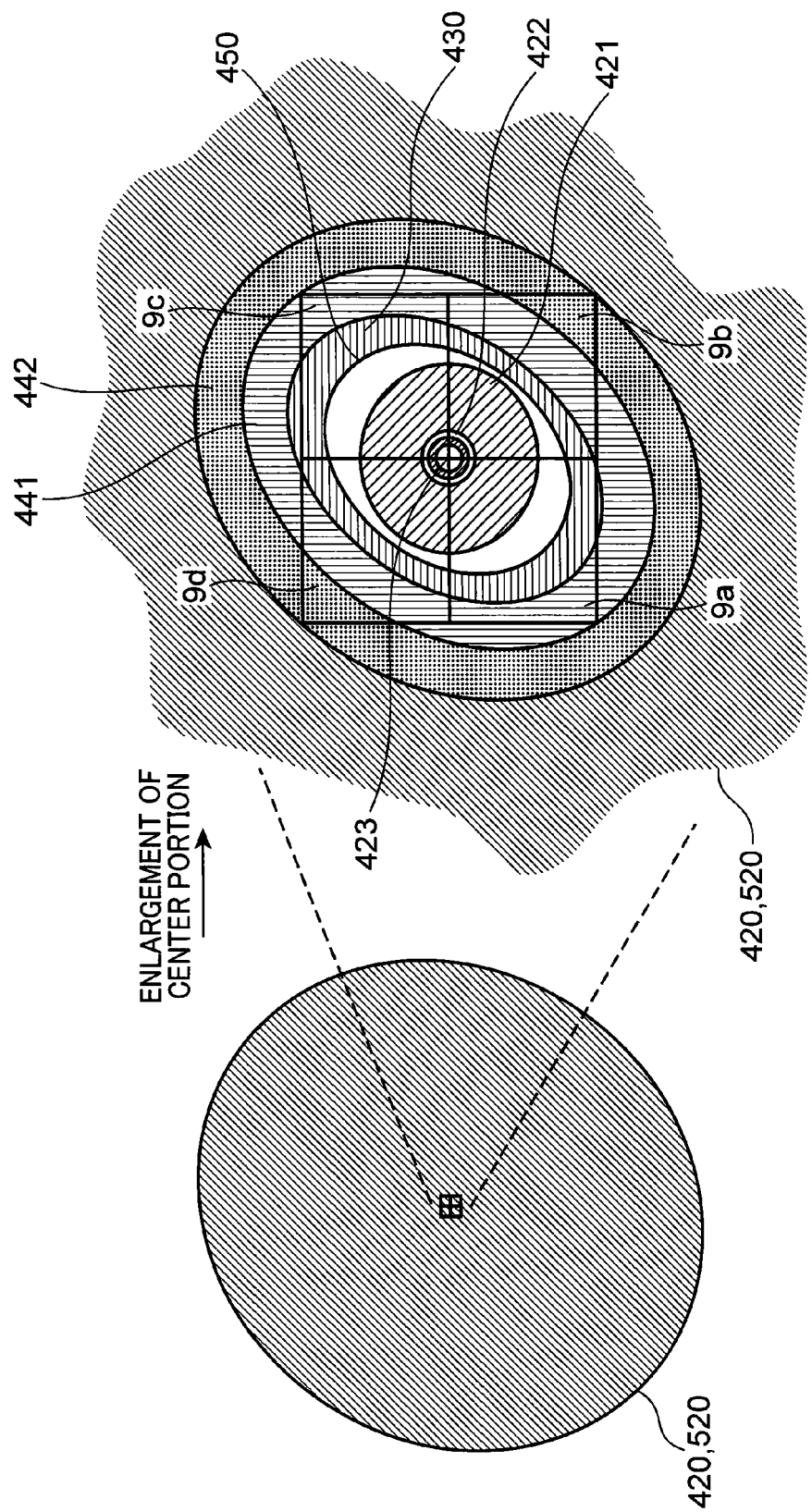
FIG. 6 is a view showing a spot of light transmitted by the detection hologram including two light blocking regions, which has been formed on the photodetector.

FIG. 6 is a view schematically showing a spot of light transmitted by the detection hologram 7 including the two light blocking regions 7x and 7y, which has been formed on the photodetector 9. The left drawing of FIG. 6 shows an external view of the light spot formed by a reflected light (stray light) beam from another layer, and the right drawing of FIG. 6 shows an enlarged view of the center portion of the photodetector 9.

It is assumed that the information recording layer on which the blue light beam 610 is converged by the objective lens to reproduce information is called a main recording layer and another information recording layer other than the main recording layer is called another layer. The another layer light beams 420 and 520 are examples of the stray light beam reflected from another layer and incident on the photodetector 9, and the signal light beam 421 is a light beam reflected from the main recording layer and incident on the photodetector 9. The photodetector 9 has four light receiving portions 9a, 9b, 9c, and 9d which receive the blue light beam reflected by the information recording layers of the optical disc 12.

By the light blocking region 7y, the annular belt-like shadows 441 and 442 surrounding the optical axes of the stray light beams are formed, the annular belt-like shadows 441 and 442 being located at different positions on the light receiving surface. The shadow 441 is not reached by the another layer light beam 420, but is reached only by the another layer light beam 520. On the other hand, the shadow 442 is not reached by the another layer light beam 520, but is reached only by the another layer light beam 420.

Thus, each of the regions where the shadows 441 and 442 are formed is reached by either one of the another layer light beam 420 and the another layer light beam 520 so that interference between the another layer light beams does not occur. If the ring-shaped light blocking region 7y is provided at a midpoint in the optical path reaching the photodetector 9, it is possible to prevent the occurrence of the interference in two regions (e.g., the shadows 441 and 442) formed by the ring-shape light blocking region 7y.

On the other hand, the shadow 422 is formed also in the signal light beam 421 (portion hatched with right downwardly inclined lines of FIG. 6), and the portion of the signal light beam 421 corresponding to the shadow 422 is missing, but only one shadow is formed by the ring-shaped light blocking region 7y. That is, by only causing the missing of the signal light beam resulting from the shadow corresponding to one ring-shaped light blocking region 7y, it is possible to reduce the interference in the interfering portions of the another layer light beams by means of the shadow corresponding to two ring-shaped light blocking regions 7y. Therefore, in the same manner as in first embodiment, it is possible to obtain the effect of allowing a remarkable reduction in the influence of the interference, while minimizing a reduction in signal intensity.

In second embodiment, the light blocking region 7x is further formed on the detection hologram 7. When the middle portion of the laser light is blocked by the light blocking region 7x, as shown in the right drawing of FIG. 6, the major part of each of the another layer light beams 420 and 520 reaching the light receiving portions 9a to 9d in the photodetector 9 are blocked. A boundary 450 represents the boundary between the region where the another layer light beams 420 and 520 are blocked by the light blocking region 7x and the region where either one of the another layer light beams 420 and 520 is blocked by the light blocking regions 7x and 7y. In the interior of the boundary 450, each of the two another layer light beams 420 and 520 is blocked, and interference with the signal light beam 421 can remarkably be suppressed and reduced. A region 430 (horizontally hatched portion) exterior to the boundary 450 is a portion in which the another layer light beam 520 is blocked by the light blocking region 7x. On the region 430, the another layer light beam 420 is incident, but the interference between the another layer light beams 420 and 520 is avoided.

On the other hand, the signal light beam 421 has light (center portion 423) including the optical axis of the laser light beam which is blocked by the light blocking region 7x. However, only the middle portion of the signal light beam 421 is partly missing, and the light passing through the outer peripheral side of the light blocking region 7x is incident on the light receiving portions 9a to 9d in the photodetector 9. The influence on the signal light beam 421 is only limited to a local reduction in the amount of light in the middle portion thereof, and signal reproduction can excellently be performed.

Therefore, as shown in FIG. 6, the amount of the signal light beam 421 and the another layer light beams 420 and 520 overlapping in the light receiving portions 9a to 9d in the photodetector 9 is reduced, and the problem associated with the interference between the signal light beam 421 and the another layer light beams 420 and 520 can be avoided. The amount of the detected signal light beam 421 does not fluctuate, and the stabilization of a servo signal and an information signal can be achieved.

Even still another layer light, which is converged to a degree higher than the degree of convergence of the signal light beam 421 and temporarily converged before reaching. the photodetector 9, expands to be larger than the signal light beam 421 on the photodetector 9. Therefore, in the same manner as in the case of the another layer light beams 420 and 520, light (light in the center portion) including the optical axis of the still another layer light beam at the center thereof is blocked by the light blocking region 7x. In this case also, the amount of the detected signal light beam 421 does not fluctuate, and the stabilization of the servo signal and the information signal can be achieved.

Note that, between the light blocking region 7x and the light blocking region 7y, a region where no light blocking region is formed exists. This configuration makes it possible to more reliably prevent a reduction in the intensity of the signal light and reduce the interfering light beams.

It will be appreciated that, in second embodiment also, the optical disc may also have four or more information recording layers. For example, it is assumed that the optical disc has first to fourth information recording layers L0, L1, L2, and L3 which are mentioned in the order of decreasing distance from the laser light incident surface. Here, the light blocking region 7x and the light blocking region 7y may also be formed such that the outer peripheral diameter of a shadow formed through the blocking of the another layer light beam from the fourth information recording layer L3 by the light blocking region 7x equals the inner peripheral diameter of a shadow formed through the blocking of the another layer light beam from the third information recording layer L2 by the light blocking region 7y. This configuration makes it possible to efficiently reduce the influence of the interfering light beams.

In the present embodiment, the light blocking region 7y corresponds to an example of a first light blocking region, and the light blocking region 7x corresponds to an example of a second light blocking region.

(Third Embodiment)

Figure 7:
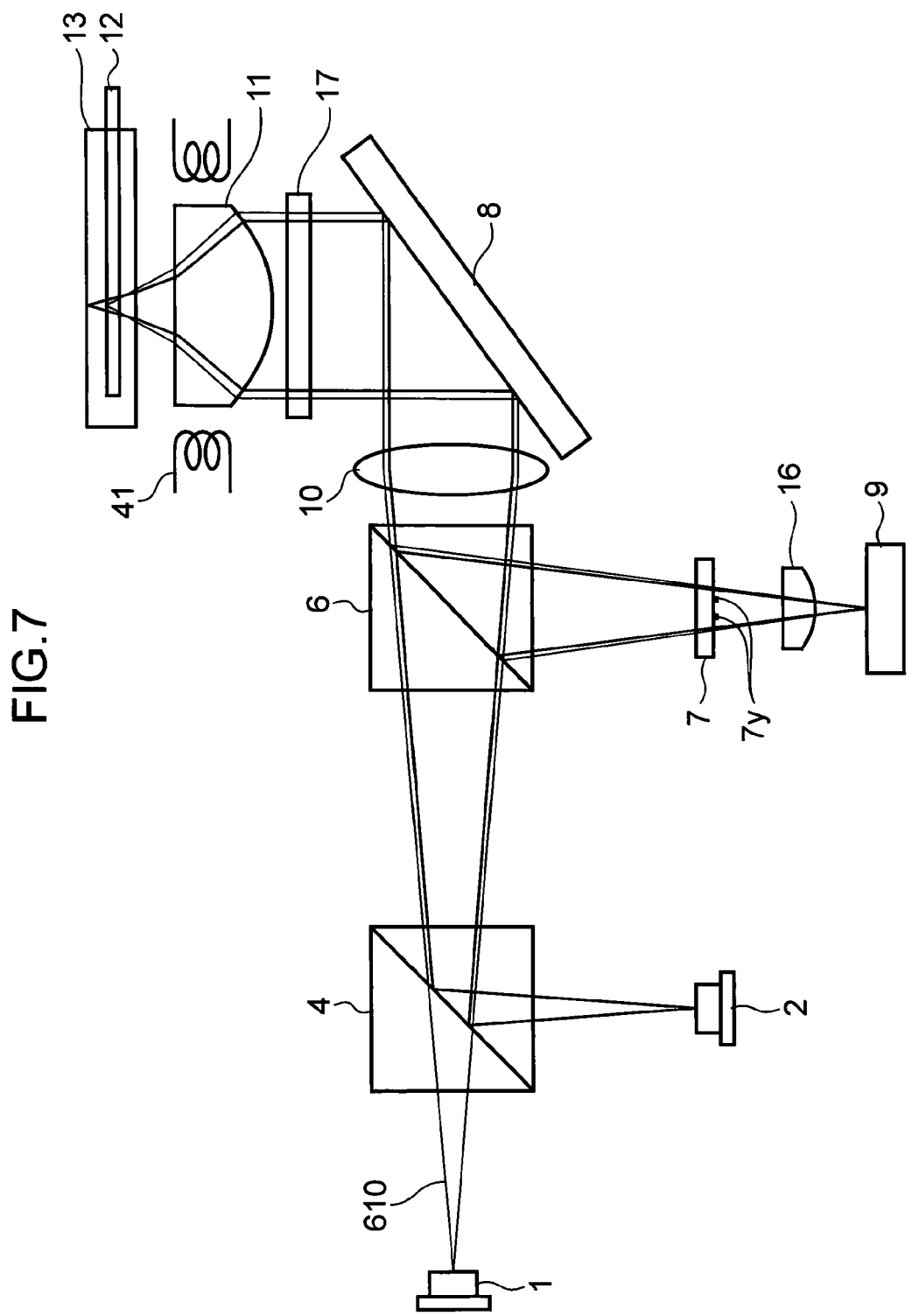
FIG. 7 is a view showing a configuration of an optical head device of third embodiment of the present invention.

FIG. 7 is a view showing a configuration of an optical head device in third embodiment of the present invention. In FIG. 7, the optical head device includes the laser light source 1, the laser light source 2, the beam splitter 4, the beam splitter 6, the detection hologram (diffractive optical element) 7, the standing mirror 8, the photodetector 9, the collimator lens 10, the objective lens 11, the detection lens 16, the ¼ wavelength plate 17, and the objective lens actuator 41.

The laser light source 1 emits a laser light beam (blue light beam) at the wavelength λ1 (ranging from 390 nm to 415 nm but, since 405 nm is normally used in most cases, a wavelength ranging from 390 nm to 415 nm is generally referred to as a wavelength of about 405 nm). The laser light source 2 emits a laser light beam (red light beam) at a wavelength λ2 (ranging from 630 nm to 680 nm but, since 660 nm is normally used in most cases, a wavelength ranging from 630 nm to 680 nm is generally referred to as a wavelength of about 660 nm). The collimator lens 10 converts a laser light beam to generally parallel light. The standing mirror 8 bends an optical axis.

The objective lens 11 focuses the laser light beams through base members having different thicknesses in accordance with the wavelengths. The objective lens 11 focuses the blue light beam emitted from the laser light source 1 onto an information recording layer of the optical disc 12 through the base member having the first thickness t1. The objective lens 11 also focuses the red light beam emitted from the laser light source 2 onto an information recording layer of an optical disc 13 through the base member having a second thickness t2 larger than the first thickness t1.

The objective lens actuator 41 moves the objective lens 11 in an optical axis direction and in a disc radial direction. The objective lens actuator 41 also causes the objective lens 11 to follow the surface deflection and eccentricity of the optical discs.

The optical disc 12 is a third generation optical disc which has the base member thickness t1 of about 0.1 mm (hereinbelow, a base member thickness ranging from 0.05 mm to 0.11 mm will be referred to as a base member thickness of about 0.1 mm) or less than 0.1 mm and on or from which information is recorded or reproduced using a light beam at the wavelength $\lambda 1$. The optical disc 13 is a second generation optical disc such as, e.g., a DVD, which has the base member thickness t2 of about 0.6 mm (hereinbelow, a base member thickness ranging from 0.54 mm to 0.65 mm will be referred to as a base member thickness of about 0.6 mm) and on or from which information is recorded or reproduced using a light beam at the wavelength $\lambda 2$. In FIG. 7, of the optical discs 12 and 13, only the base members from the light incident surfaces thereof to the information recording layers thereof are shown. In an actual situation, each of the base members is bonded to a protective plate (or protective member) to have an enhanced mechanical strength and an outer diameter of 1.2 mm, which is the same as the outer diameter of a CD. The optical disc 13 is bonded to a protective member having a thickness of 0.6 mm. The optical disc 12 is bonded to a protective member having a thickness of 1.1 mm. In FIG. 7, the protective members are omitted for the sake of clear illustration.

Preferably, each of the laser light sources 1 and 2 is formed of a semiconductor laser light source. This can reduce the size, weight, and power consumption of the optical head device and those of an optical information device using the optical head device.

The detection hologram 7 diffracts the blue light beam or the red light beam reflected by an information recording layer of the optical disc 12 or the optical disc 13. The light blocking region 7y is disposed on the light flux of a reflected light beam resulting from reflection by the information recording layer on which the blue light beam is focused. When there are at least two information recording layers on the blue light beam incident side of the information recording layer on which the blue light beam is focused or on the side thereof opposite to the blue light beam incident side, the light blocking region 7y blocks the blue light beam incident on a region in the photodetector 9 where reflected light beams resulting from reflection by the at least two information recording layers interfere with each other. The light blocking region 7y is formed on the detection hologram 7 which diffracts the reflected light beam resulting from the reflection by the information recording layer on which the blue light beam is focused.

The detection lens 16 converges the blue light beam reflected by the information recording layer of the optical disc 12 onto the photodetector 9 and converges the red light beam reflected by the information recording layer of the optical disc 13 onto the photodetector 9.

The photodetector 9 receives the blue light beam reflected by the information recording layer of the optical disc 12 or the red light beam reflected by the information recording layer of the optical disc 13, and outputs an electric signal in accordance with the amount of the received blue light beam or red light beam.

Note that, in the present embodiment, the laser light source 1 corresponds to an example of a first laser light source, the laser light source 2 corresponds to an example of the second laser light source, the optical disc 12 corresponds to an example of the first optical information medium, and an optical disc 13 corresponds to an example of a second optical information medium.

When information is recorded or reproduced on or from the optical disc 12 having a highest recording density, a blue light beam 610 at the wavelength $\lambda 1$ emitted from the laser light source 1 is transmitted by the beam splitter 4 and the beam splitter 6 and made to be generally parallel light by the collimator lens 10. The blue light beam 610 converted to the generally parallel light has the optical axis thereof bent by the standing mirror 8 and is converted to circularly polarized light by the ¼ wavelength plate 17. The ¼ wavelength plate 17 is designed to function as a ¼ wavelength plate for each of the wavelength $\lambda 1$ and the wavelength $\lambda 2$. The blue light beam 610 converted to the circularly polarized light is focused by the objective lens 11 onto the information recording layer of the optical disc 12 through the base member thereof having a thickness of about 0.1 mm.

The blue light beam 610 reflected by the information recording layer reversely follows the previously followed optical path and is transmitted by the objective lens 11. The blue light beam 610 transmitted by the objective lens 11 is converted by the ¼ wavelength plate 17 to linearly polarized light in a direction perpendicular to the outward path thereof and reflected by the beam splitter 6. The blue light beam 610 reflected by the beam splitter 6 has a part thereof diffracted by the detection hologram 7, which is imparted with an astigmatism by the detection lens 16, together with the undiffracted light, to be incident on the photodetector 9. Through an arithmetic operation of an output of the photodetector 9, a servo signal used for focal control and tracking control and an information signal are obtained.

Next, when information is recorded or reproduced on or from the optical disc 13, the red light beam which is generally linearly polarized light at the wavelength $\lambda 2$ emitted from the laser light source 2 is reflected by the beam splitter 4, transmitted by the beam splitter 6, and converted by the collimator lens 10 to generally parallel light. The red light beam converted to the generally parallel light has the optical axis thereof bent by the standing mirror 8 and converted by the ¼ wavelength plate 17 to circularly polarized light. The red light beam converted to the circularly polarized light is focused by the objective lens 11 onto the information recording layer of the optical disc 13 through the base member thereof having a thickness of about 0.6 mm.

Note that the positions of the laser light source 1 and the laser light source 2 may be interchanged. In this case, the wavelength transmitted by the beam splitter 4 and the wavelength reflected thereby are interchanged. By providing a configuration in which the beam splitter 4 reflects the blue light beam, the effect of allowing the avoidance of degradation of an adhesive bonding the prism junction surface of the beam splitter 4 due to the transmission of the blue light beam is achieved, and the range of selection of the adhesive can be expanded. Alternatively, it may also be possible to interchange the positions of the laser light source 1 and the optical components of the signal detection optical system including the detection hologram 7 and the photodetector 9.

Then the red light beam reflected by the information recording layer reversely follows the previously followed optical path and is transmitted by the objective lens 11. The red light beam transmitted by the objective lens 11 is converted by the ¼ wavelength plate 17 to linearly polarized light in a direction perpendicular to the outward path thereof and reflected by the beam splitter 6. The red light beam reflected by the second beam splitter 6 is imparted with an astigmatism by the detection lens 16 to be incident on the photodetector 9.

Through an arithmetic operation of an output of the photodetector 9, a servo signal used for focal control and tracking control and an information signal are obtained.

Thus, in order to obtain the servo signals for the optical disc 12 and the optical disc 13 from the common photodetector 9, the laser light source 1 and the laser light source 2 are arranged such that each of the light emitting points thereof has an imaging relationship with the focal position of the objective lens 11 closer to the optical discs. The arrangement achieves the effect of allowing reductions in the number of photodetectors and the number of wiring lines. Focus error signals are generated using a so-called astigmatic method in which a focal spot imparted with an astigmatism by the detection lens 16 is detected with a quartered light receiving portion in the photodetector 9.

On the other hand, a tracking error signal for the optical disc 12 is generated using a signal obtained by receiving the diffracted light generated by the detection hologram 7 and subjecting the diffracted light received by the photodetector 9, to photoelectric conversion. Alternatively, if the optical disc 12 is a reproduction-only disc, the tracking error signal is generated using a so-called phase difference detection method in which a zero-order diffracted light beam transmitted by the detection hologram 7 is detected with the quartered light receiving pattern in the photodetector 9.

A tracking error signal for the optical disc 13 may also be generated by the same method as used in the case of generating the tracking error signal for the optical disc 12. As another configuration, it may also be possible that the optical head device further includes a diffractive element which divides the red light beam emitted from the laser light source 2 into a main beam as a zero-order light beam and a sub-beam as a plus/minus first-order diffracted light beam and generate the tracking error signal using the three beams. Alternatively, the tracking error signal for the optical disc 13 may also be generated using a so-called phase difference detection method in which the zero-order diffracted light beam transmitted by the detection hologram 7 is detected with the quartered light receiving portion in the photodetector 9.

Note that, on the detection hologram 7 of third embodiment, only the light blocking region 7y of first embodiment is formed. However, the present invention is not particularly limited thereto, and the light blocking region 7x and the light blocking region 7y may also be formed as in second embodiment. In FIG. 7, only the light blocking region 7y is shown by way of example.

Next, using FIGS. 8A and 8B, a description will be given to the function and configuration of the light blocking region provided on the detection hologram 7. The detection hologram 7 of third embodiment includes the light blocking region 7y described in first embodiment or the light blocking region 7y and the light blocking region 7x each described in second embodiment.

In first and second embodiments, the description has been given only to the effect achieved in the case where only the blue light beam at the wavelength λ1 is transmitted by the detection hologram 7. In third embodiment, a description will be given to the case where light beams at mutually different wavelengths are transmitted by the detection hologram 7.

Figure 8A:
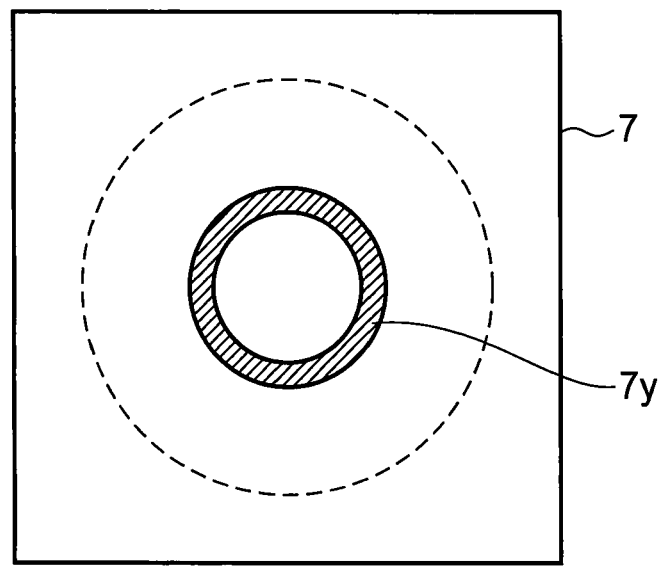
FIG. 8A is a top view showing a configuration of a detection hologram in third embodiment of the present invention.
Figure 8B:
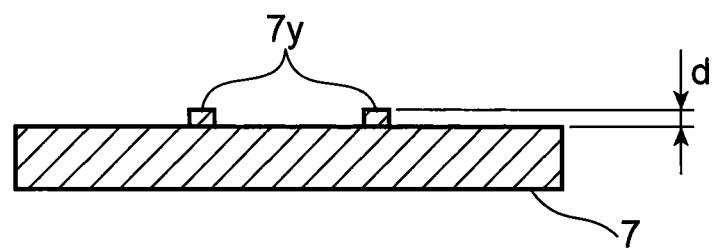
FIG. 8B is a cross-sectional view of the detection hologram shown in FIG. 8A.

FIG. 8A is a top view showing the configuration of the detection hologram in third embodiment of the present invention, and FIG. 8B is a cross-sectional view of the detection hologram shown in FIG. 8A.

With regard to the red light beam at the wavelength λ2, it can be considered that, when information is not recorded or reproduced on or from a multilayer optical disc having three or more information recording layers, the influence of interference is not serious. In that case, blocking of even a part of the middle of the signal light beam results in a reduction in signal-to-noise ratio (S/N ratio). Therefore, it is undesirable to block the middle portion of the signal light beam. Accordingly, in third embodiment, a film (portion having a thickness d in FIG. 8B) forming the light blocking region is not formed of a related-art mere reflection film or absorption film, but is formed of a dichroic film having a wavelength selectivity.

Figure 9:
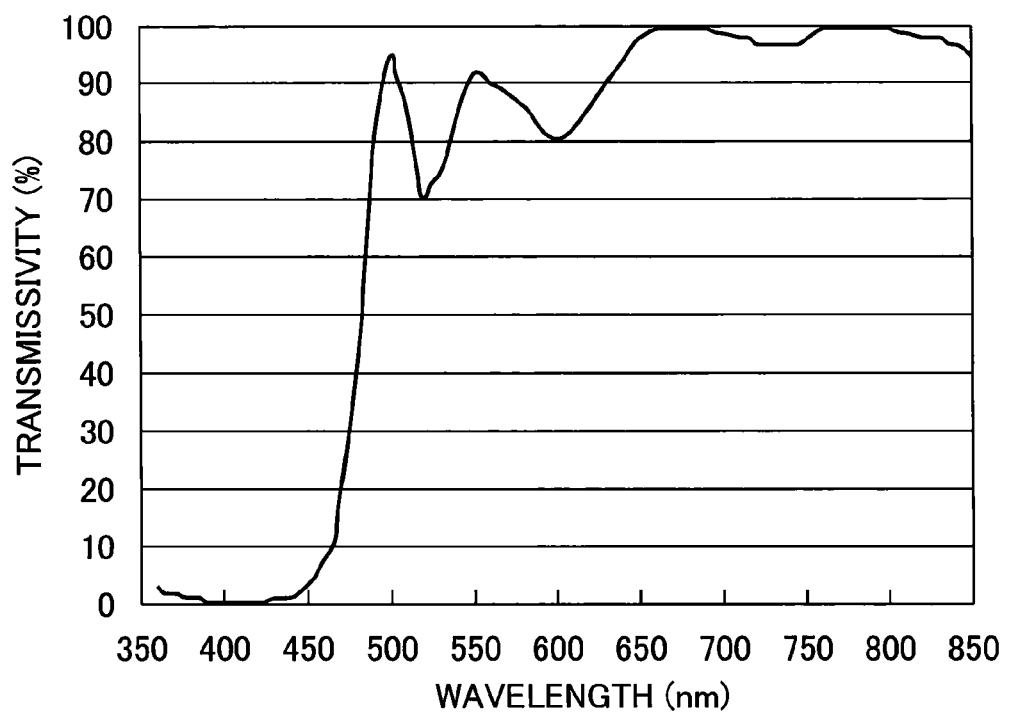
FIG. 9 is a view showing an example of the wavelength characteristic of the transmissivity of a light blocking region formed of a dichroic film.

FIG. 9 is a view showing an example of the wavelength characteristic of the transmissivity of the wavelength selective light blocking region formed of the dichroic film. In FIG. 9, the abscissa axis represents the wavelength and the ordinate axis represents the transmissivity of the wavelength selective light blocking region. The transmissivity of the light blocking region 7y to the blue light beam (the wavelength λ1 is about 405 nm) for reproducing or recording information from or on the multilayer optical disc 12 is set low. On the other hand, the transmissivity of the light blocking region 7y to a wavelength longer than that of the red light beam (the wavelength λ2 is not less than 650 nm) which is not used for the multilayer optical disc having three or more information recording layers is set high. For example, it is desirable to set the transmissivity of the wavelength selective light blocking region 7y to the light beam at a long wavelength of not less than 650 nm, to 90% or more.

By thus forming the light blocking region 7y of the dichroic film having the low transmissivity to a short wavelength such as that of the blue light beam and the high transmissivity to a long wavelength such as that of the red light beam, it is possible to solve the problem associated with the interference when information is reproduced or recorded from or on the multilayer optical disc having three or more information recording layers using the blue light beam and simultaneously obtain the remarkable effect of allowing the S/N ratio at the time of reproduction from an existing optical disc using the red light beam to be held excellently high and allowing stable recording or reproduction of information.

In the case where the optical disc 13 from which reproduction is performed using the red light beam is a dual-layer optical disc, even if the problem of interference is less serious than that of the multilayer optical disc having three or more information recording layers, at least some of reflected light from another layer is incident on the photodetector 9. Therefore, if there is a disturbance in the phase of the signal light, the signal quality may be degraded. For example, when the tracking error signal is detected by a push-pull method, a part of the signal light is separated and subjected to a differential arithmetic operation. If there is a portion in a different phase, it interferes with another layer light. If the interfering portion moves with the movement of the objective lens during a tracking follow, it may cause an unneeded signal change such as a change in signal amplitude. As for the blue light beam at the wavelength λ1, it is substantially blocked by the dichroic film so that a phase disturbance presents no problem.

However, the present inventors have further focused attention on the fact that, since the red light beam is transmitted by the light blocking region 7y, it is also necessary to pay attention to the phase. When a dichroic film is locally formed as shown in FIG. 8B, the red light beam transmitted by the dichroic film advances in a medium different from air, such as a dielectric material. Consequently, a phase difference is produced between the red light beam transmitted by the dichroic film and the red light beam transmitted by a member other than the dichroic film. To reduce the influence of the phase difference, the phase difference due to the dichroic film may be set appropriately to a value close to an integral multiple of $2\pi$. A phase difference P between the red light beam transmitted by the light blocking region 7y and the red light beam transmitted by the region other than the light blocking region 7y is given by the following expression:

$$P=2\pi N+C \text{ (wherein N is an integer)}.$$

It is desirable that, in the foregoing expression, the absolute value of the value C is not more than 1/10 of 2π. In other words, it is desirable that the absolute value of the value C is not more than 0.2π.

As a result of the study conducted by the present inventors on film design, it has been made clear that, for the dichroic film to obtain such a wavelength characteristic as shown FIG. 9, the phase difference P needs to be set to be not less than π. On the other hand, even when the phase different P is 2πN, if the wavelength deviates from a design center value, the phase difference becomes obvious and the amount of the phase difference is proportional to N. Accordingly, it has been found that 1 is optimum as the absolute value of N. In other words, it is desirable that the absolute value of the phase difference P is in a range of not less than 1.8π and not more than 2.2π for the red light beam. In short, it is desirable that the phase difference P imparted by the light blocking region 7y to the red light beam satisfies 1.8π≦|P|≦2.2π.

The present embodiment has the remarkable effect of allowing the problem to be solved by forming the light blocking region having a dichroic property on the detection hologram 7 without increasing the number of components. However, the dichroic property and restrictions on the phase difference for the red light beam are independent features, which contribute to the solution of the problem.

(Fourth Embodiment)

Figure 10:
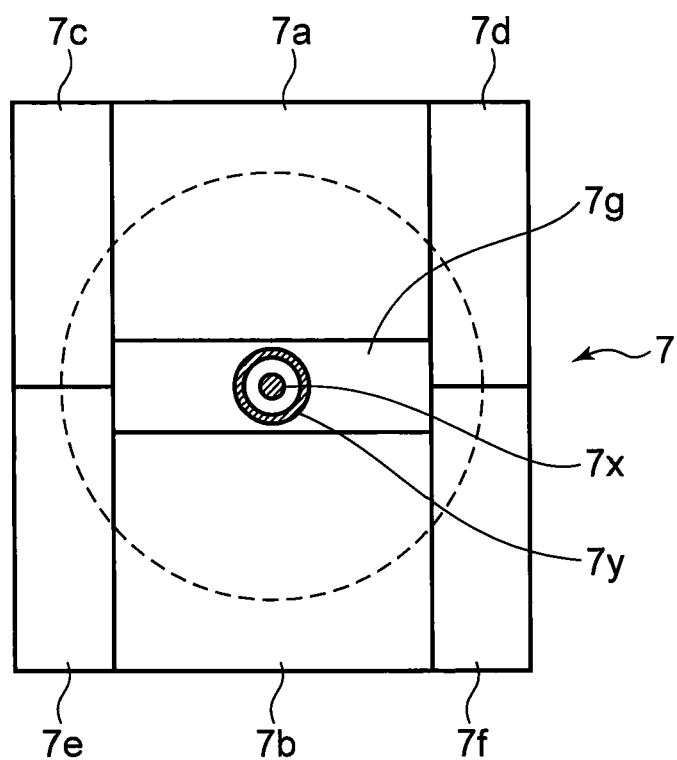
FIG. 10 is a view schematically showing a divided light flux pattern of a detection hologram in fourth embodiment of the present invention.
Figure 11:
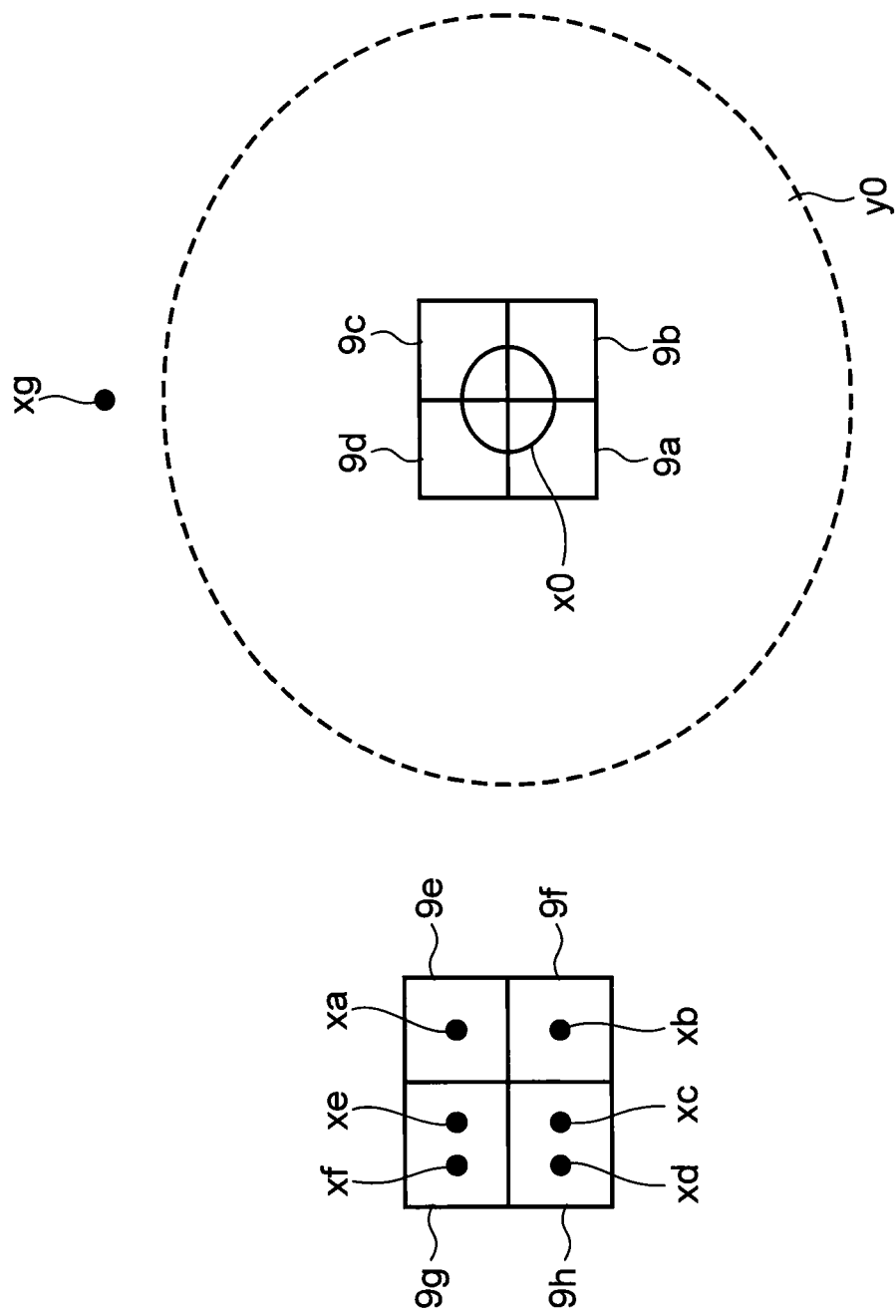
FIG. 11 is a view schematically showing a configuration of light receiving portions of a photodetector and laser light beams reflected by an optical disc and reaching the photodetector.

Using FIGS. 10, 11, and 12, a description will be given to the function and configuration of a detection hologram and a photodetector which can be combined with any of first to third embodiments described above. A tracking error signal when information is recorded or reproduced on or from the optical disc 12 is generated using plus first-order diffracted light beams resulting from diffraction by the detection hologram 7. FIG. 10 is a view schematically showing a divided light flux pattern of the detection hologram 7 in fourth embodiment of the present invention. FIG. 11 is a view schematically showing a configuration of the light receiving portions of the photodetector 9 and laser light beams reflected by an optical disc and reaching the photodetector 9.

Note that the broken line in FIG. 10 shows the effective light flux diameter of a laser light beam incident on the detection hologram 7. The detection hologram 7 in FIG. 10 includes the light blocking regions 7x and 7y, but the present invention is not particularly limited thereto. The detection hologram 7 may also include only the light blocking region 7y.

The detection hologram 7 has seven transmission regions 7a to 7g and divides the laser light incident thereon into a zero-order diffracted light beam and plus/minus first-order diffracted light beams. When a zero-order diffracted light beam x0 and plus first-order diffracted light beams xa to xg shown in FIG. 11 are referenced, the zero-order diffracted light beam x0 is generated by the transmission regions 7a to 7g. On the other hand, the plus first-order diffracted light beam xa is generated by the transmission region 7a. Likewise, the plus first-order diffracted light beam xb is generated by the transmission region 7b, the plus first-order diffracted light beam xc is generated by the transmission region 7c, the plus first-order diffracted light beam xd is generated by the transmission region 7d, the plus first-order diffracted light beam xe is generated by the transmission region 7e, the plus first-order diffracted light beam xf is generated by the transmission region 7f, and the plus first-order diffracted light beam xg is generated by the transmission region 7g.

The photodetector 9 has the total of at least eight light receiving portions 9a to 9h. The light receiving portions 9a to 9d are used to generate focus error signals for the optical discs 12 and 13 and signals for reproducing information recorded on the optical discs 12 and 13. The light receiving portions 9a to 9d are also used to generate tracking error signals according to a phase difference method. On the other hand, the light receiving portions 9e to 9h are used to generate tracking error signals.

By forming the light receiving portions 9a to 9d for generating the focus error signal and the light receiving portions 9e to 9h for generating the tracking error signals on the same semiconductor substrate, it is possible to reduce the size of the optical head device and reduce the number of process steps in assembling the optical head device.

The light receiving portions 9a to 9h output electric current signals I9a to I9h in accordance with the respective amounts of light received thereby. A focus error signal FE is obtained through the arithmetic operation of FE=(I9a+I9c)−(I9b+I9d). On the other hand, a tracking error signal TE is obtained through the arithmetic operation of TE=(I9e−I9f)−k(I9h−I9g).

The zero-order diffracted light beam x0 is received by the four light receiving portions 9a to 9d. Likewise, the plus first-order diffracted light beam xa is received by the light receiving portion 9e, the plus first-order diffracted light beam xb is received by the light receiving portion 9f, the plus first-order diffracted light beams xc and xd are received by the light receiving portion 9h, and the plus first-order diffracted light beams xe and xf are received by the light receiving portion 9g.

The zero-order diffracted light beam x0 and the plus first-order diffracted light beams xa to xg are generated through the incidence of laser light reflected by an information recording layer in an optical disc on the detection hologram 7.

Note that the plus first-order diffracted light beam xg generated by the transmission region 7g in the middle portion of the detection hologram 7 shown in FIG. 10 is diffracted in a direction orthogonal to that of each of the plus first-order diffracted light beams xa to xf so as not to be received by any of the light receiving portions. This makes it possible to reduce fluctuations in tracking error signal which occur when there are variations in the positions, widths, and depths of grooves formed in the optical disc and fluctuations in tracking error signal which are caused by the recording of information on a track. In addition, when the optical disc has a plurality of information recording layers, it is possible to avoid the incidence of unneeded light on light receiving portions used to detect the tracking error signal.

Moreover, minus first-order diffracted light beams formed at positions conjugate with those of the plus first-order diffracted light beam are also not incident on the light receiving portions 9e to 9h.

Figure 12:
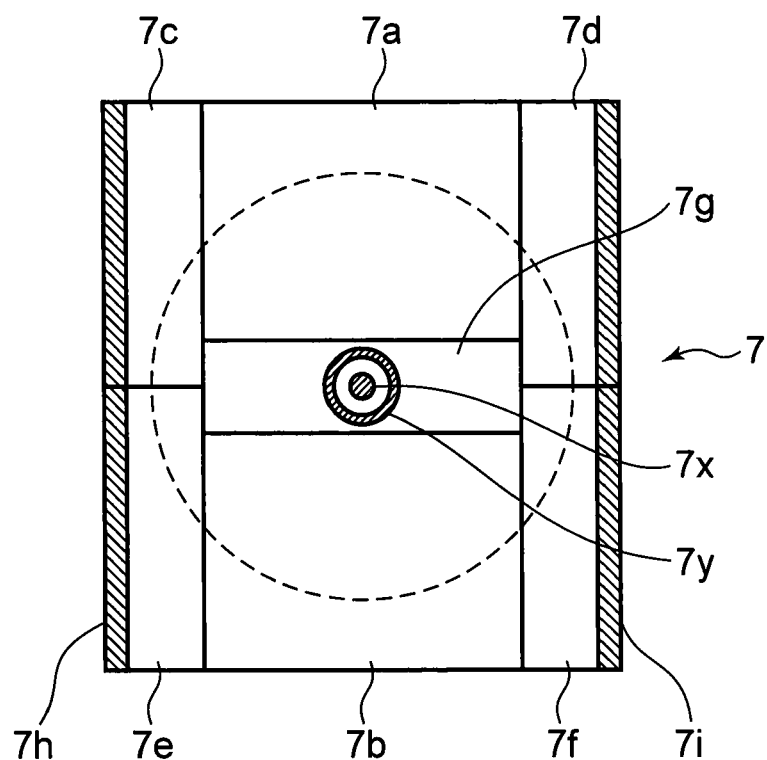
FIG. 12 is a view showing a variation of the detection hologram in fourth embodiment of the present invention.

FIG. 12 is a view showing a variation of the detection hologram in fourth embodiment of the present invention.

As shown in FIG. 12, by forming light blocking regions 7h and 7i having the same characteristics as those of the light blocking region 7x outside the transmission regions 7c to 7f, it is also possible to enhance the effect of preventing unneeded light from reaching the photodetector. More specifically, the light blocking regions 7h and 7i are formed on the outer edge portions of the detection hologram 7 extending in the radial direction thereof. The light blocking regions 7h and 7i are formed along the radial direction of the detection hologram 7.

(Fifth Embodiment)

Figure 13:
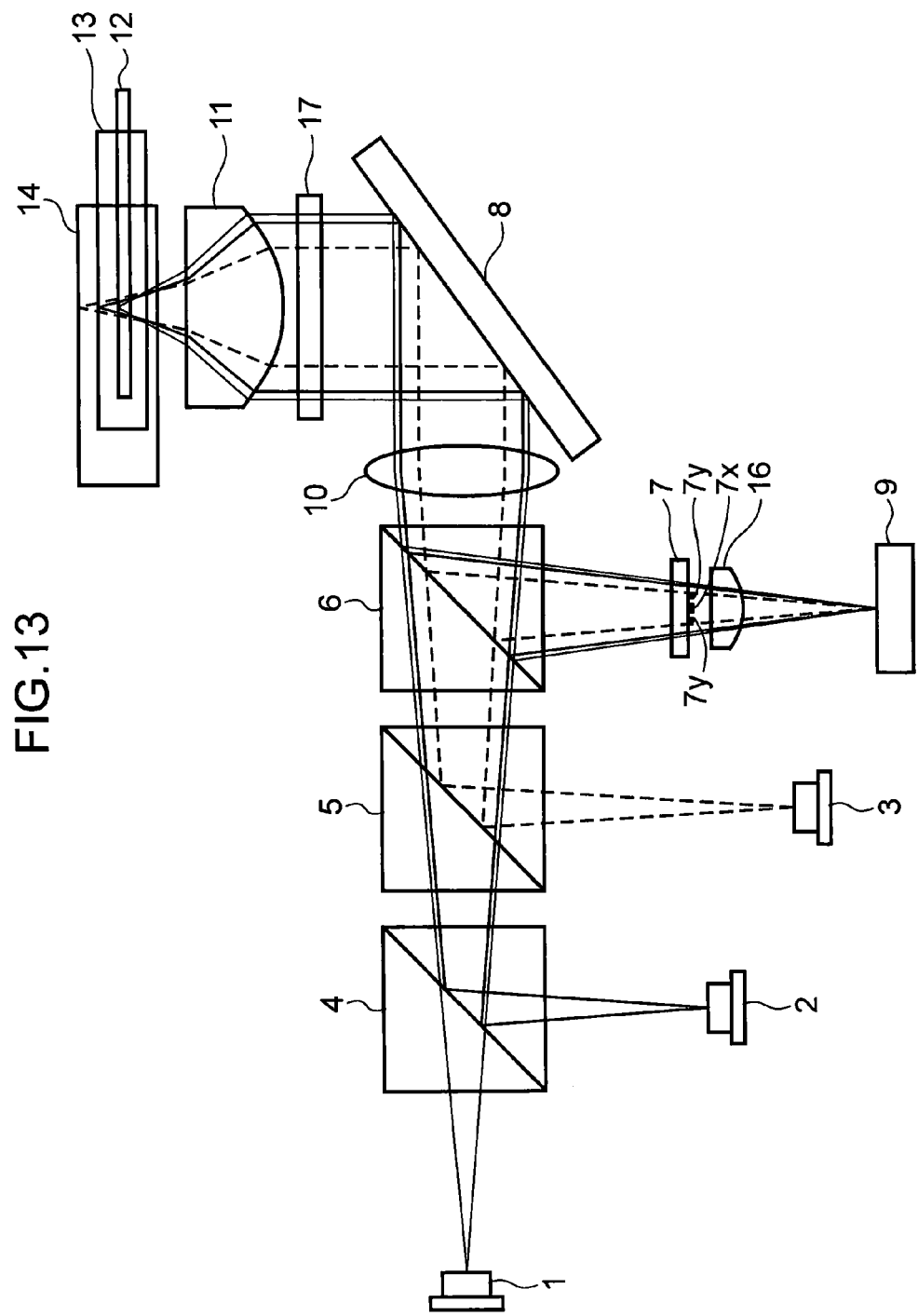
FIG. 13 is a view showing a configuration of an optical head device in fifth embodiment of the present invention.

As shown in FIG. 13, the optical head device may further include a laser light source 3 which emits infrared light. FIG. 13 is a view showing a configuration of an optical head device in fifth embodiment of the present invention. In FIG. 13, the optical head device includes the laser light source 1, the laser light source 2, a laser light source 3, the beam splitter 4, a beam splitter 5, the beam splitter 6, the detection hologram 7, the standing mirror 8, the photodetector 9, the collimator lens 10, the objective lens 11, the detection lens 16, and the ¼ wavelength plate 17. Note that, since a configuration of the optical head device in fifth embodiment except for the laser light source 3 and the beam splitter 5 is the same as the configuration of the optical head device in third embodiment shown in FIG. 7, a detailed description thereof is omitted.

The laser light source 3 emits an infrared light beam at a wavelength λ3 larger than the wavelengths λ1 and λ2. The wavelength λ3 is in a range of, e.g., 750 nm to 820 nm, and is normally 785 nm. The beam splitter 5 reflects the infrared light beam emitted from the laser light source 3, and transmits the blue light beam emitted from the laser light source 1 and the red light beam emitted from the laser light source 2. The objective lens 11 focuses the infrared light beam emitted from the laser light source 3 onto an information recording layer of an optical disc 14 through a base member having a third thickness t3 larger than the second thickness t2.

Note that the detection hologram 7 in FIG. 13 includes the light blocking regions 7x and 7y, but the present invention is not particularly limited thereto. The detection hologram 7 may also include only the light blocking region 7y.

In the present embodiment, the laser light source 1 corresponds to an example of the first laser light source, the laser light source 2 corresponds to an example of the second laser light source, the laser light source 3 corresponds to an example of a third laser light source, the optical disc 12 corresponds to an example of the first optical information medium, the optical disc 13 corresponds to an example of the second optical information medium, and the optical disc 14 corresponds to an example of a third optical information medium.

According to such a configuration, it is possible to form an optical head device capable of reproduction also from the first generation optical disc 14, such as CD. Since the first generation optical disc 14 does not have multiple layers, it is free from the problem of interference by another layer light and, in terms of improving the S/N ratio of a signal, it is desirable that the light blocking region 7x and the light blocking region 7y transmit the infrared light. Therefore, it is desirable that the light blocking region 7x and the light blocking region 7y have such a dichroic property as shown in FIG. 9.

Figure 14:
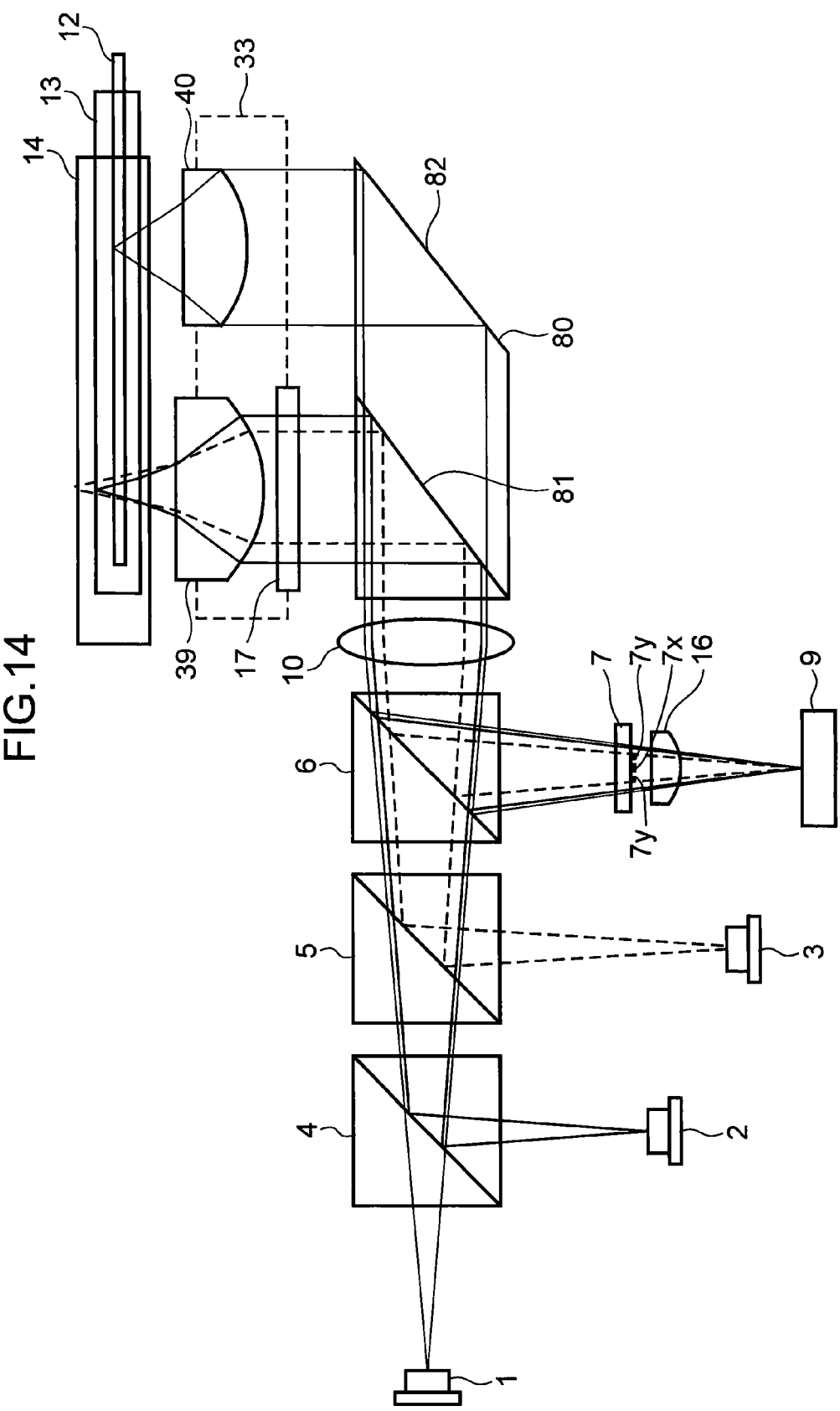
FIG. 14 is a view showing a configuration of an optical head device in a variation of fifth embodiment of the present invention.

Thus far, the configuration using the one objective lens 11 has been shown by way of example, but a configuration using two objective lenses having different optical axes is also possible. FIG. 14 is a view showing a configuration of an optical head device in a variation of fifth embodiment of the present invention.

In FIG. 14, the optical head device includes the laser light source 1, the laser light source 2, the laser light source 3, the beam splitter 4, the beam splitter 5, the beam splitter 6, the detection hologram 7, the photodetector 9, the collimator lens 10, the detection lens 16, the ¼ wavelength plate 17, an objective lens holder 33, a first objective lens 39, a second objective lens 40, and a standing prism 80. Note that, since the configuration of the optical head device shown in FIG. 14 except for the objective lens holder 33, the first objective lens 39, the second objective lens 40, and the standing prism 80 is the same as the configuration of the optical head device in fifth embodiment shown in FIG. 13, a detailed description thereof is omitted.

As shown in FIG. 14, the first objective lens 39 focuses an infrared light beam onto an information recording layer of the optical disc 14, and focuses a red light beam onto an information recording layer of the optical disc 13. On the other hand, the second objective lens 40 focuses a blue light beam onto an information recording layer of the optical disc 12.

The standing prism 80 has a first surface 81 having the property of reflecting the red light and the infrared light and transmitting the blue light and a second surface 82 having the property of reflecting the blue light transmitted by the first surface. The objective lens holder 33 holds the first objective lens 39, the second objective lens 40, and the ¼ wavelength plate 17.

Note that the detection hologram 7 in FIG. 14 includes the light blocking regions 7x and 7y, but the present invention is not particularly limited thereto. The detection hologram 7 may also include only the light blocking region 7y.

Also, in FIG. 14, the optical head device includes the laser light source 1 to 3, but the present invention is not particularly limited thereto. It may also be possible that the optical head device includes the laser light sources 1 and 2, the first objective lens 39 focuses the red light, and the second objective lens 40 focuses the blue light.

Even such a configuration in which the two objective lenses are mounted can be combined with any of the embodiments described above, and the same effects can be obtained.

Note that, in the case where information is reproduced or recorded on or from a dual-layer disc using the red light also, the interference between multilayer light beams may present a problem. In such a case, it is preferable that the light blocking region 7x is, or the light blocking region 7x and the light blocking region 7y are formed of a dichroic film which transmits only the infrared light beam and blocks the blue light beam and the red light beam.

(Sixth Embodiment)

Figure 15:
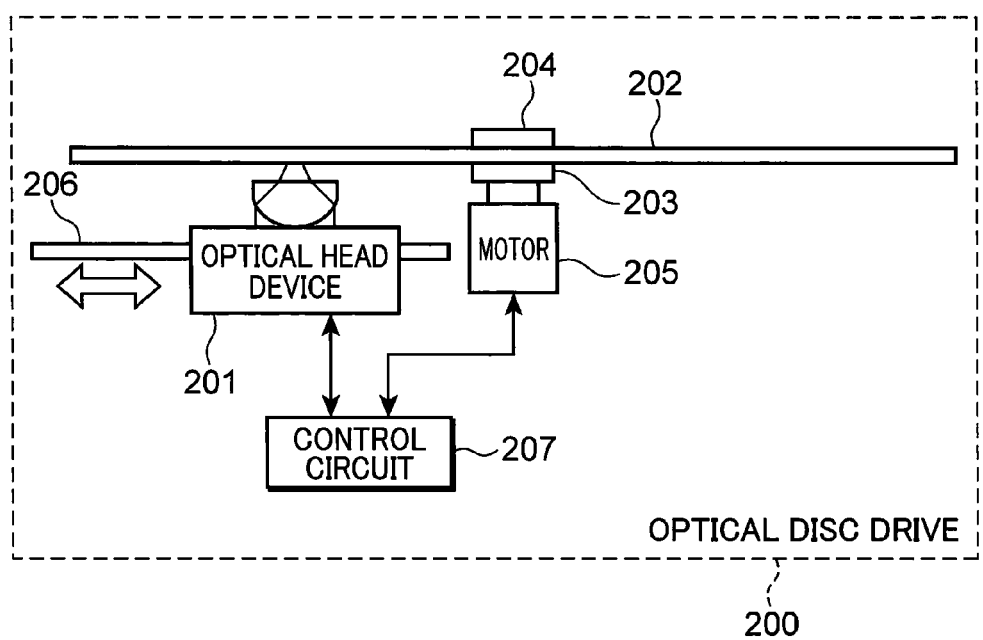
FIG. 15 is a view showing an overall configuration of an optical disc drive as an example of an optical information device in sixth embodiment of the present invention.

FIG. 15 shows an optical information device using the optical head device of the present invention. FIG. 15 is a view showing an overall configuration of an optical disc drive as an example of the optical information device in sixth embodiment of the present invention.

An optical disc drive 200 includes an optical head device 201, a motor (rotation system) 205, a traverse (transfer system) 206, and a control circuit (control unit) 207. An optical disc 202 is held and fixed between a turn table 203 and a clamper 204, and rotated by the motor 205.

The optical head device 201 described in any of first to fifth embodiments is placed on the traverse 206. The traverse 206 moves the optical head device 201 in a radial direction of the optical disc 202. This allows light emitted by the optical head device 201 for irradiation to move from the inner periphery of the optical disc 202 to the outer periphery thereof.

The control circuit 207 performs focus control, tracking control, traverse control, rotation control for the motor 205, and the like based on the signals received from the optical head device 201. The control circuit 207 also performs the reproduction of information from a reproduction signal and the transmission of a recording signal to the optical head device 201.

In FIG. 15, the optical disc 202 is placed on the turn table 203 and rotated by the motor 205. The optical head device 201 described in any of first to fifth embodiments is roughly moved by the traverse 206 to the position of the track of the optical disc 202 where desired information exists.

Further, the optical head device 201 transmits a focus error signal and a tracking error signal to the control circuit 207 correspondingly to the positional relationship with the optical disc 202. The control circuit 207 transmits a signal for slightly moving an objective lens to the optical head device 201 in response to the focus error signal and the tracking error signal. With the signal, the optical head device 201 performs the focus control and the tracking control on the optical disc 202 and performs the reading (reproduction), writing (recording) or erasing of information.

The optical information device of sixth embodiment uses the optical head device described in any of first to fifth embodiments as the optical head device. Therefore, the optical information device has the effect of achieving compatibility with a plurality of optical discs having different recording densities by means of the one optical head device.

(Seventh Embodiment)

Figure 16:
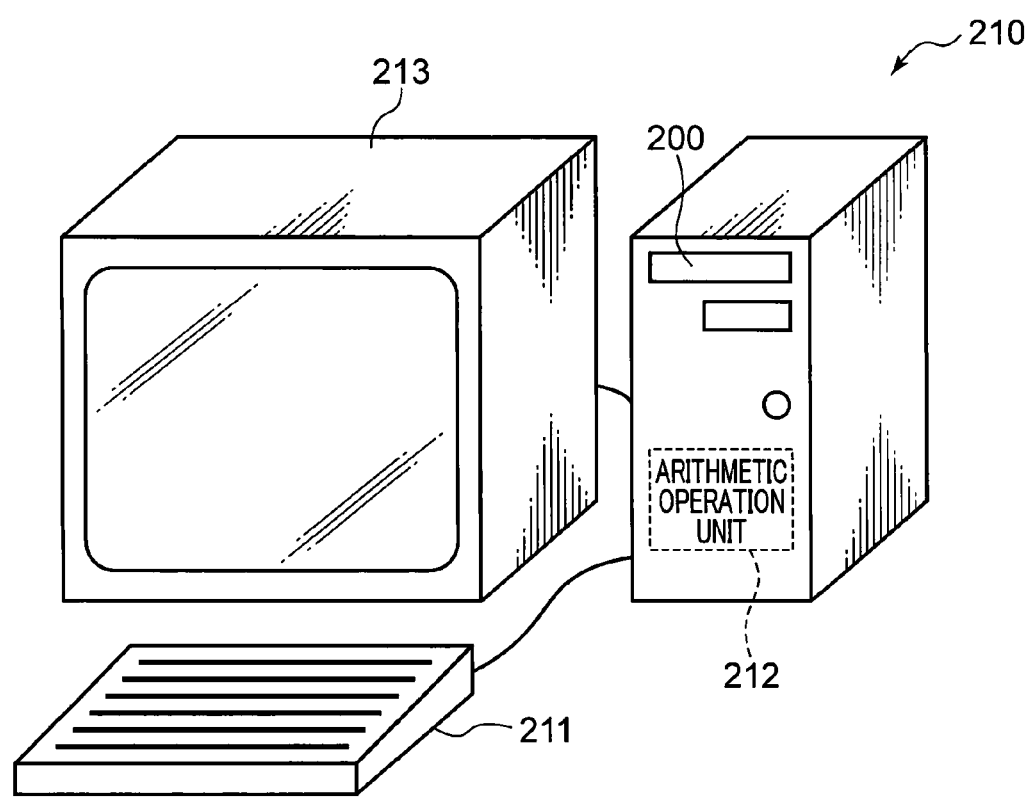
FIG. 16 is a schematic perspective view showing an overall configuration of a computer in seventh embodiment of the present invention.

FIG. 16 shows a computer including the optical disc drive (optical information device) 200 of sixth embodiment. FIG. 16 is a schematic perspective view showing an overall configuration of the computer in seventh embodiment of the present invention.

In FIG. 16, a computer 210 includes the optical disc drive 200 of sixth embodiment, an input device 211 for inputting information such as a keyboard, a mouse, or a touch panel, an arithmetic operation unit 212 for performing an arithmetic operation based on information input from the input device 211, information read from the optical disc drive 200, and the like, such as a central processing unit (CPU), and an output device 213 such as a cathode ray tube or a liquid crystal display device for displaying information such as the result of the arithmetic operation performed by the arithmetic operation unit 212 or a printer for printing information.

Note that, in seventh embodiment, the computer 210 corresponds to an example of an information processing device, and the arithmetic operation device 212 corresponds to an example of an information processing unit.

The computer 210 including the optical disc drive (optical information device) 200 of sixth embodiment described above can stably record or reproduce information on or from different types of optical discs and can be used for a wide range of applications.

(Eighth Embodiment)

Figure 17:
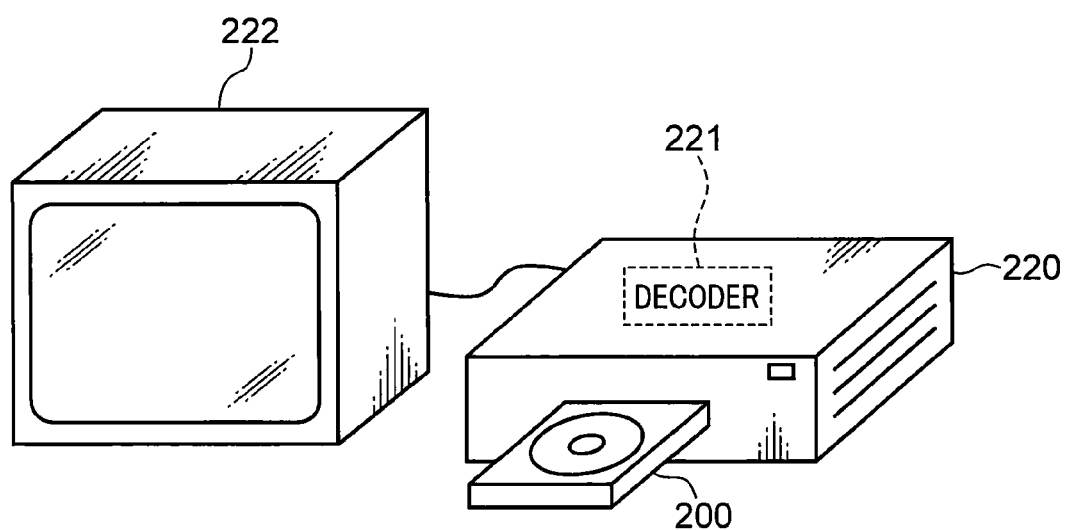
FIG. 17 is a schematic perspective view showing an overall configuration of an optical disc player in eighth embodiment of the present invention.

FIG. 17 shows an embodiment of an optical disc player including the optical disc drive (optical information device) 200 of sixth embodiment. FIG. 17 is a schematic perspective view showing an overall configuration of the optical disc player in eighth embodiment of the present invention.

In FIG. 17, an optical disc player 220 includes the optical disc drive 200 of sixth embodiment and a decoder 221 which converts an information signal obtained from the optical disc drive 200 to an image signal. Further, the optical disc player 220 can also be used as a car navigation system by being provided with an additional position sensor such as GPS. The optical disc player 220 may also include a display device 222 such as a liquid crystal monitor.

In eighth embodiment, the optical disc player 220 corresponds to an example of the information processing device and the decoder 221 corresponds to an example of the information processing unit.

The optical disc player 220 including the optical disc drive (optical information device) 200 of sixth embodiment described above can stably record or reproduce information on or from different types of optical discs, and can be used for a wide range of applications.

(Ninth Embodiment)

Figure 18:
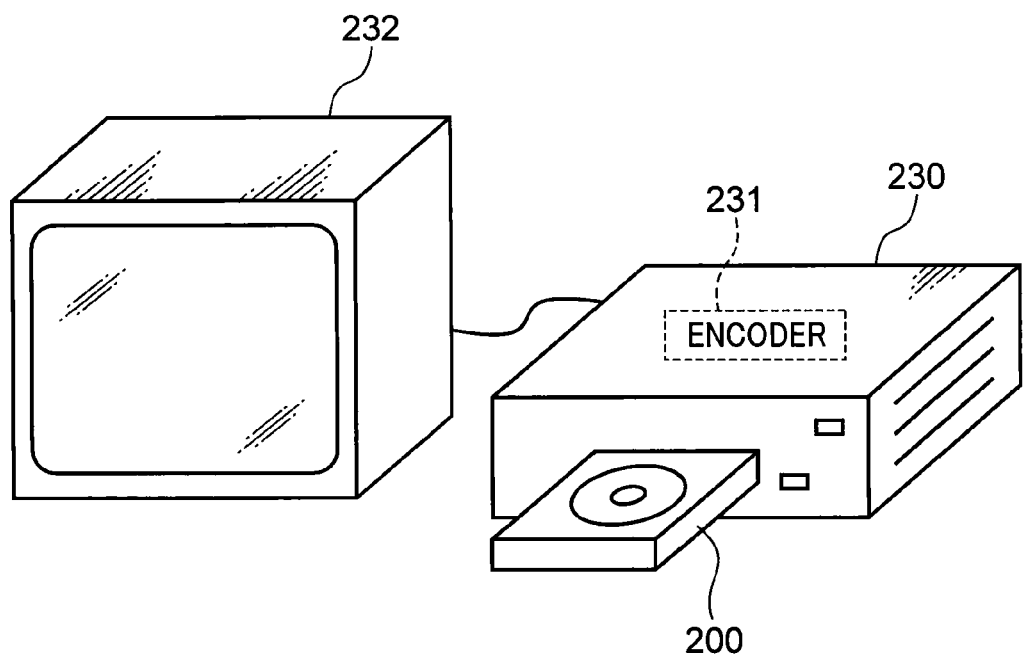
FIG. 18 is a schematic perspective view showing an overall configuration of an optical disc recorder in ninth embodiment of the present invention.

FIG. 18 shows an optical disc recorder including the optical disc drive (optical information device) 200 of sixth embodiment. FIG. 18 is a schematic perspective view showing an overall configuration of the optical disc recorder in ninth embodiment of the present invention.

In FIG. 18, the optical disc recorder 230 includes the optical disc drive 200 of sixth embodiment and an encoder 231 which converts image information to an information signal for recording the information on an optical disc using the optical disc drive 200. It is desirable that, by including also a decoder which converts the information signal obtained from the optical disc drive 200 to an image signal, the optical disc recorder 230 can also reproduce information that has been already recorded. Note that the optical disc recorder 230 may also include an output device 232 such as a cathode ray tube or a liquid crystal display device for displaying information or a printer for printing information.

Note that, in ninth embodiment, the optical disc recorder 230 corresponds to an example of the information processing device, and the encoder 231 corresponds to an example of the information processing unit.

The optical disc recorder 230 including the optical disc drive (optical information device) 200 of sixth embodiment described above can stably record or reproduce information on or from different types of optical discs, and can be used for a wide range of applications.

(Tenth Embodiment)

Figure 19:
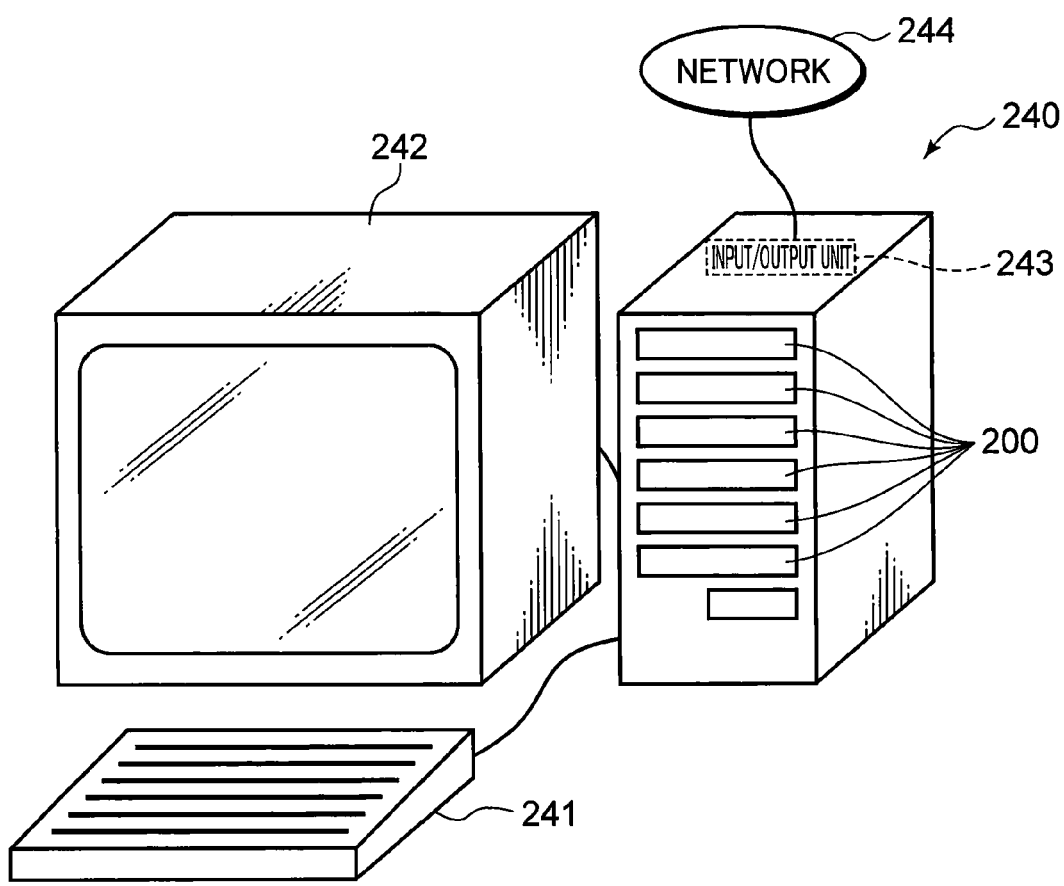
FIG. 19 is a schematic perspective view showing an overall configuration of an optical disc server in tenth embodiment of the present invention.
Figure 20:
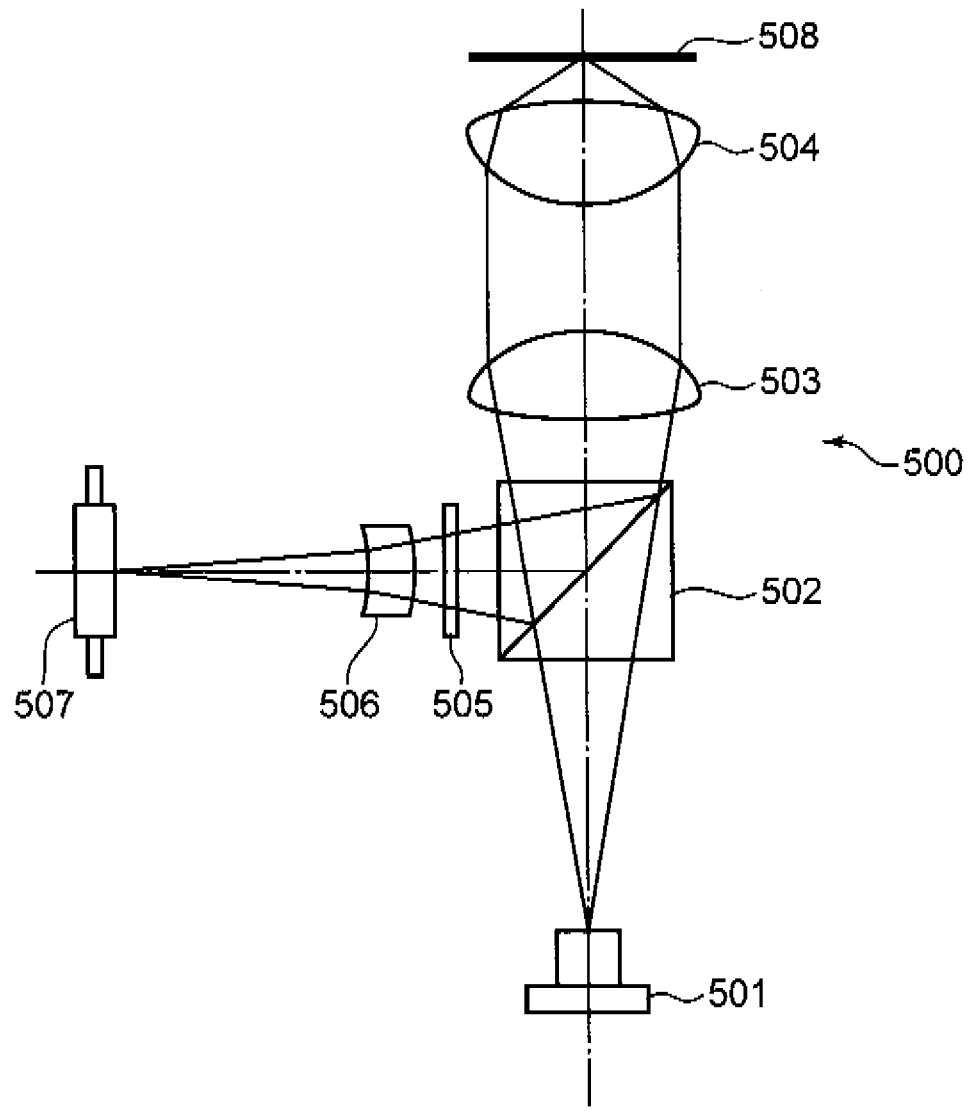
FIG. 20 is a view showing a schematic configuration of an optical head of a first related-art example.
Figure 21:
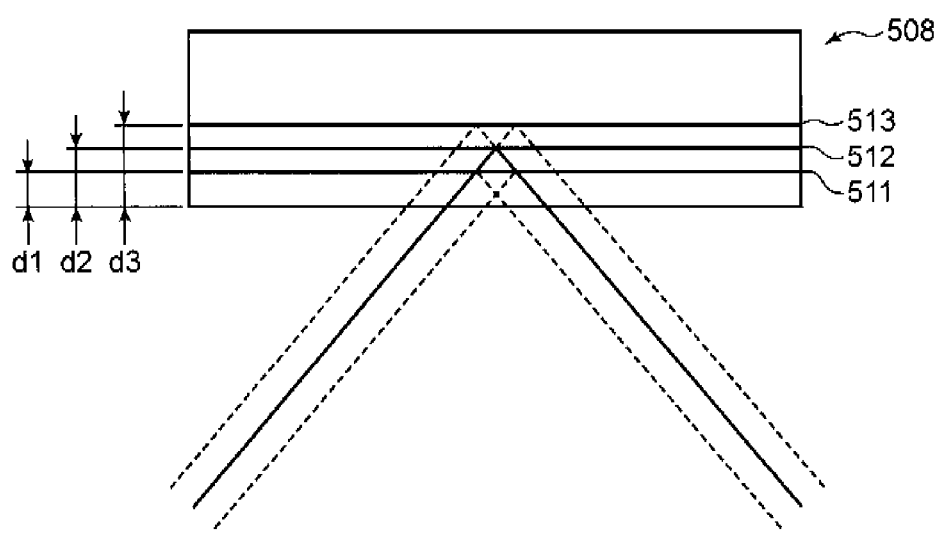
FIG. 21 is a view showing a schematic configuration of an optical disc of the related-art example.
Figure 22:
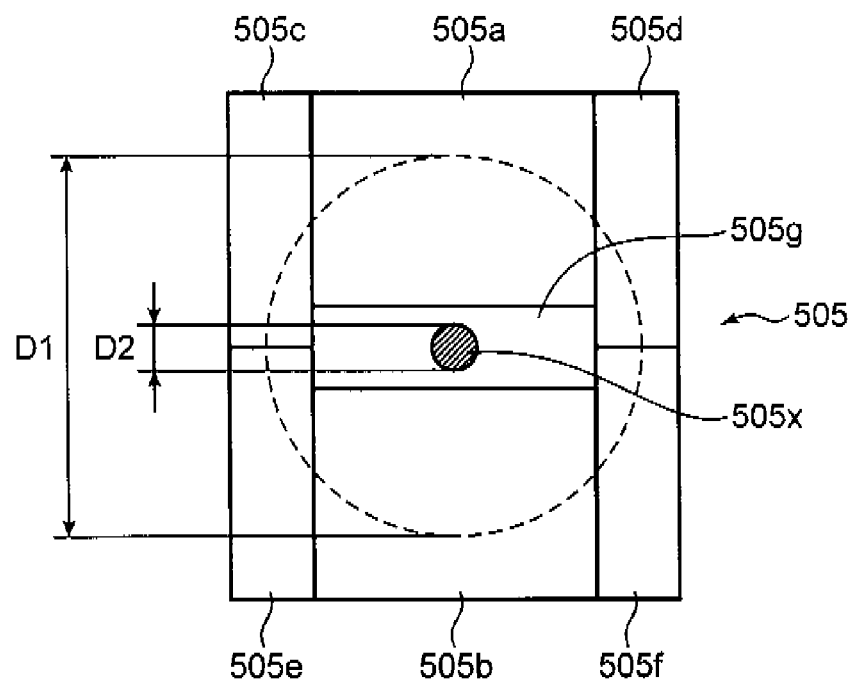
FIG. 22 is a view showing a schematic configuration of a detection hologram of the related-art example.
Figure 23:
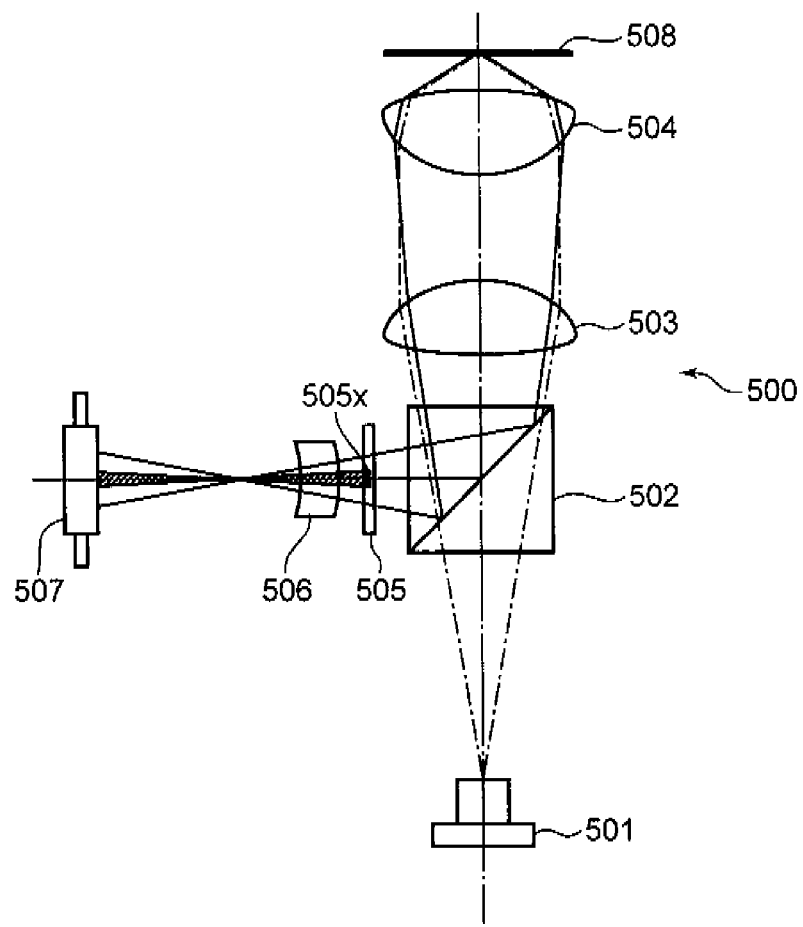
FIG. 23 is a view schematically showing an optical path of a reflected light beam resulting from reflection by a first information recording layer located on a side closer to a laser light incident surface when information is recorded or reproduced on or from a second information recording layer of an optical disc using an optical head of a related art example.
Figure 24:
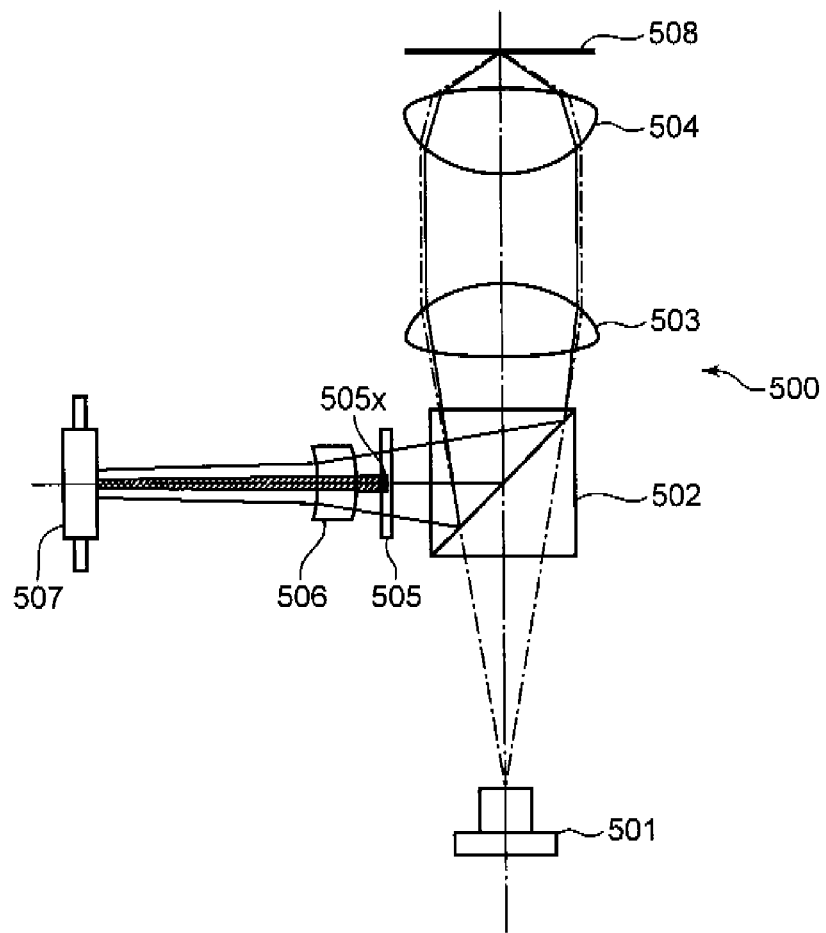
FIG. 24 is a view schematically showing an optical path of a reflected light beam resulting from reflection by a third information recording layer located on a side more distant from the laser light incident surface when information is recorded or reproduced on or from the second information recording layer of the optical disc using the optical head of the related art example.
Figure 25:
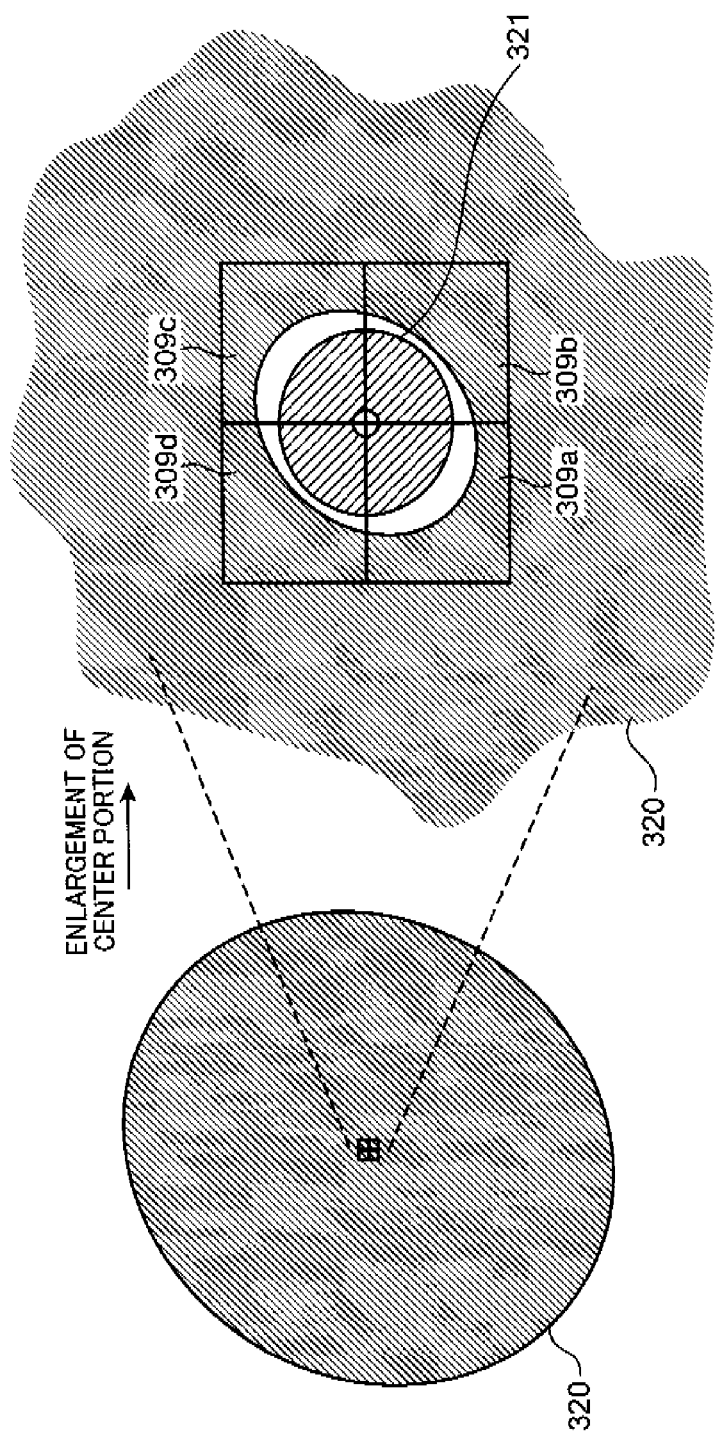
FIG. 25 is a view schematically showing a light spot formed on light receiving portions of the related art optical head.

FIG. 19 shows an optical disc server including the optical disc drive (optical information device) 200 of sixth embodiment. FIG. 19 is a schematic perspective view showing an overall configuration of the optical disc server in tenth embodiment of the present invention.

In FIG. 19, the optical disc server 240 includes the optical disc drive 200 of sixth embodiment, an input device 241 for inputting information such as a keyboard, a mouse, or a touch panel and an input/output unit 243 for inputting/outputting information recorded or reproduced by the optical disc drive 200 to/from the outside. The input/output unit 243 is connected to a network 244 such as, e.g., the Internet.

In response to a request from the network 244, the optical disc drive 200 transmits information (such as, e.g., image, sound/voice, video, HTML document, and text document) recorded on an optical disc by taking advantage of its large capacity. The optical disc drive 200 also records information transmitted from the network 244 on a place requested thereby.

The input/output unit 243 wiredly or wirelessly retrieves information to be recorded using the optical disc drive 200 or outputs information read using the optical disc drive 200 to the outside. As a result, the optical disc server 240 can exchange information with a plurality of equipment such as, e.g., a computer, telephone, or television tuner via the network 244 and can be used as an information server common to the plurality of equipment. Note that the optical disc server 240 may also include an output device 242 such as a cathode ray tube or a liquid crystal display device which displays information or a printer which prints information.

By further including a plurality of the optical disc drives 200 and a changer which inserts and retrieves a plurality of optical discs to and from the plurality of optical disc drives 200, the optical disc server 240 can record a large amount of information.

Note that, in tenth embodiment, the optical disc server 240 corresponds to an example of the information processing device, and the input/output unit 243 corresponds to an example of the information processing unit.

The optical disc server including the optical disc drive (optical information device) 200 of sixth embodiment described above can stably record or reproduce information on or from different types of optical discs, and can be used for a wide range of applications.

Note that, in seventh to tenth embodiments described above, the output devices 213, 232 and 242 and the display devices 222 are shown in FIGS. 16 to 19. However, it will be appreciated that there can be a product form in which each of the devices includes an output terminal and does not include any of the output devices 213, 232 and 242 and the display devices 222, which are sold separately. In FIGS. 17 and 18, an input device is not shown, but there can also be a product form in which the optical disc player 220 or the optical disc recorder 230 also includes an input device such as keyboard, touch panel, mouse, or remote controller. Conversely, in seventh to tenth embodiments described above, the input devices are sold separately and there can also be a form in which each of the devices includes an input terminal.

Note that, in the specific embodiments described above, the invention having the following configuration is mainly included.

An optical head device according to an aspect of the present invention is an optical head device which records or reproduces information on or from a first optical information medium having three or more recording layers, including: a first laser light source which emits a first light beam; a focusing optical system which focuses the first light beam emitted from the first laser light source onto one of the recording layers of the first optical information medium; a photodetector which receives the first light beam reflected by the recording layer of the first optical information medium and outputs an electric signal in accordance with an amount of the received first light beam; and a first light blocking region disposed on a light flux of the reflected light beam resulting from the reflection by the recording layer on which the first light beam is focused, to block, when there are at least two recording layers on a first light beam incident side of the recording layer on which the first light beam is focused or on a side thereof opposite to the first light beam incident side, reflected light beams resulting from reflection by the at least two recording layers which are incident on a region in the photodetector where the reflected light beams resulting from the reflection by the at least two recording layers interfere with each other, wherein the first light blocking region is not formed on an optical axis of the reflected light beam resulting from the reflection by the recording layer on which the first light beam is focused.

According to this configuration, the first laser light source emits the first light beam. The focusing optical system focuses the first light beam emitted from the first laser light source onto one of the recording layers of the first optical information medium. The photodetector receives the first light beam reflected by the recording layer of the first optical information medium, and outputs the electric signal in accordance with the amount of the received first light beam. The first light blocking region is disposed on the light flux of the reflected light resulting from the reflection by the recording layer on which the first light beam is focused, to block, when there are at least two recording layers on the first light beam incident side of the recording layer on which the first light beam is focused or on the side thereof opposite to the first light beam incident side, the reflected light beams resulting from the reflection by the at least two recording layers which are incident on the region in the photodetector where the reflected light beams resulting from the reflection by the at least two recording layers interfere with each other. Note that the first light blocking region is not formed on the optical axis of the reflected light beam resulting from the reflection by the recording layer on which the first light beam is focused.

Therefore, it is possible to reduce mutual interference between the reflected light beams resulting from the reflection by the at least two recording layers present on the first light beam incident side of the recording layer on which the first light beam is focused or on the side thereof opposite to the first light beam incident side, and improve the S/N ratio of the signal outputted from the photodetector.

It is preferable that, in the above optical head device, the first light blocking region is a region surrounding the optical axis of the reflected light resulting from the reflection by the recording layer on which the first light beam is focused.

According to the configuration, the first light blocking region is the region surrounding the optical axis of the reflected light resulting from the reflection by the recording layer on which the first light beam is focused. Therefore, it is possible to reduce interference by a reflected light beam from another recording layer other than the recording layer on which the first light beam is focused without reducing the amount of the reflected light beam resulting from the reflection by the recording layer on which the first light beam is focused.

It is also preferable that, in the above optical head device, the first light blocking region has a ring shape.

According to the configuration, the first light blocking region has the ring shape. Therefore, it is possible to reduce interference by a reflected light beam from another recording layer other than the recording layer on which the first light beam is focused without reducing the amount of the reflected light beam resulting from the reflection by the recording layer on which the first light beam is focused.

It is also preferable that, in the above optical head device, the first light blocking region has a ring shape at least a portion of which is missing.

According to the configuration, the first light blocking region has the ring shape at least a portion of which is missing. Therefore, it is possible to reduce interference by a reflected light beam from another recording layer other than the recording layer on which the first light beam is focused without further reducing the amount of the reflected light beam resulting from the reflection by the recording layer on which the first light beam is focused.

It is also preferable that, in the above optical head device, the first light blocking region is formed on a diffractive optical element which diffracts the reflected light beam resulting from the reflection by the recording layer on which the first light beam is focused.

According to the configuration, the first light blocking region is formed on the diffractive optical element which diffracts the reflected light beam resulting from the reflection by the recording layer on which the first light beam is focused. Therefore, it is possible to measure the amount of the light beam diffracted by the diffractive optical element, and align the optical axis with the position of the center of the first light blocking region.

It is also preferable that the above optical head device further includes: a second light blocking region disposed on a center point of the reflected light beam resulting from the reflection by the recording layer on which the first light beam is focused, to block the reflected light beams resulting from the reflection by the at least two recording layer, wherein the second light blocking region is disposed inwardly of the first light blocking region.

According to the configuration, the second light blocking region disposed on the center point of the reflected light beam resulting from the reflection by the recording layer on which the first light beam is focused can prevent a reflected light beam from another recording layer other than the recording layer on which the first light beam is focused from being incident on the photodetector.

It is also preferable that, in the above optical head device, the second light blocking region is formed on a diffractive optical element which diffracts the reflected light resulting from the reflection by the recording layer on which the first light beam is focused.

According to the configuration, the second light blocking region is formed on the diffractive optical element which diffracts the reflected light resulting from the reflection by the recording layer on which the first light beam is focused. Therefore, it is possible to measure the amount of the light beam diffracted by the diffractive optical element, and align the optical axis with the position of the center of the second light blocking region.

It is also preferable that the above optical head device further includes: a second laser light source which emits a second light beam at a wavelength longer than that of the first light beam, wherein the first light beam includes a blue light beam, the second light beam includes a red light beam, the focusing optical system focuses the blue light beam emitted from the first laser light source onto one of the recording layers of the first optical information medium and focuses the red light beam emitted from the second laser light source onto a recording layer of a second optical information medium different from the first optical information medium, and the first light blocking region has a wavelength selective light blocking property which blocks the blue light beam, and transmits the red light beam.

According to the configuration, the second laser light source emits the second light beam at the wavelength longer than that of the first light beam. The first light beam includes the blue light beam, and the second light beam includes the red light beam. The focusing optical system focuses the blue light beam emitted from the first laser light source onto one of the recording layers of the first optical information medium and focuses the red light beam emitted from the second laser light source onto the recording layer of the second optical information medium different from the first optical information medium. The first light blocking region has the wavelength selective light blocking property which blocks the blue light beam, and transmits the red light beam.

Thus, the first light blocking region has the wavelength selective light blocking property which blocks the blue light beam, and transmits the red light beam. As a result, the red light beam which is less affected by interference by a reflected light beam from another recording layer other than the recording layer on which the first light beam is focused is transmitted thereby. Therefore, it is possible to further improve the S/N ratio of a signal corresponding to the red light beam outputted from the photodetector.

In the above optical head device, it is preferable that the focusing optical system includes two objective lenses having mutually different optical axes.

According to the configuration, it is possible to focus the blue light on the first optical information medium using one of the two objective lenses and focus the red light on the second optical information medium using the other objective lens.

It is also preferable that, in the above optical head device, a phase difference P imparted by the first light blocking region to the red light beam is given by the following expression, in which N is an integer, and an absolute value of C is not more than $1/10$ of $2\pi$:

$$P=2\pi N+C.$$

According to the configuration, by bringing the phase difference imparted by the first light blocking region to the red light beam closer to an integral multiple of $2\pi$, it is possible to reduce the influence of the phase difference.

It is also preferable that, in the above optical head device, the phase difference P imparted by the first light blocking region to the red light beam satisfies $1.8\pi \leq |P| \leq 2.2\pi$.

According to the configuration, the phase difference P imparted by the first light blocking region to the red light beam satisfies $1.8\pi \leq |P| \leq 2.2\pi$. Therefore, it is possible to further reduce the influence of the phase difference.

It is also preferable that the above optical head device further includes: a third laser light source which emits a third light beam at a wavelength longer than that of the second light beam, wherein the third light beam includes an infrared light beam, the focusing optical system focuses the infrared light beam emitted from the third laser light source onto a recording layer of a third optical information medium different from the first optical information medium and the second optical information medium, and the first light blocking region has a wavelength selective light blocking property which blocks the blue light beam, transmits the red light beam, and transmits also the infrared light beam.

According to the configuration, the third laser light source emits the third light beam at a wavelength longer than that of the second light beam. The third light beam includes the infrared light beam. The focusing optical system focuses the infrared light beam emitted from the third laser light source onto the recording layer of the third optical information medium different from the first optical information medium and the second optical information medium. The first light blocking region has the wavelength selective light blocking property which blocks the blue light beam, transmits the red light beam, and transmits also the infrared light beam.

Thus, the first light blocking region has the wavelength selective light blocking property which blocks the blue light beam, transmits the red light beam, and transmits also the infrared light beam. As a result, the red light beam and the infrared light beam which are less affected by interference by a reflected light beam from another recording layer other than the recording layer on which the first light beam is focused are transmitted thereby. Therefore, it is possible to further improve the S/N ratios of signals corresponding to the red light beam and the infrared light beam each outputted from the photodetector.

An optical head device according to another aspect of the present invention includes: a laser light source which emits a light beam; a focusing optical system which focuses the light beam emitted from the laser light source onto a recording layer of an optical information medium; a photodetector which receives the light beam reflected by the recording layer of the optical information medium and outputs an electric signal in accordance with an amount of the receive light beam; and a light blocking region disposed on a light flux of the reflected light beam resulting from the reflection by the recording layer on which the light beam is focused, wherein the light blocking region is not formed on an optical axis of the reflected light beam resulting from the reflection by the recording layer on which the light beam is focused.

According to the configuration, the laser light source emits the light beam. The focusing optical system focuses the light beam emitted from the laser light source onto the recording layer of the optical information medium. The photodetector receives the light beam reflected by the recording layer of the optical information medium and outputs the electric signal in accordance with the amount of the receive light beam. The light blocking region is disposed on the light flux of the reflected light beam resulting from the reflection by the recording layer on which the light beam is focused. The light blocking region is not formed on the optical axis of the reflected light beam resulting from the reflection by the recording layer on which the light beam is focused.

Therefore, it is possible to reduce interference by a reflected light beam resulting from reflection by another recording layer other than the recording layer on which the light beam is focused, and improve the S/N ratio of the signal outputted from the photodetector.

An optical information device according to still another aspect of the present invention includes: the optical head device described above; a motor which rotates an optical information medium; and a control unit which controls the optical head device and the motor. According to the configuration, the above optical head device can be applied to the optical information device.

An information processing device according to yet another aspect of the present invention includes: the optical information device described above; and an information processing unit which processes information to be recorded on the optical information device and/or information reproduced from the optical information device. According to the configuration, the optical information device including the above optical head device can be applied to the information processing device.

Note that the specific embodiments or examples given in Description of Embodiments are intended only to clarify the technical contents of the present invention. The present invention should not be construed in a narrow sense as being limited to these specific examples, but can be implemented with various modifications within the spirit of the present invention and the scope of the claims.

Industrial Applicability

An optical head device, an optical information device, and an information processing device according to the present invention allow an improvement in the S/N ratio of a signal outputted from a photodetector, and are useful as an optical head device, an optical information device, and an information processing device in which information is recorded, reproduced, or erased on or from an optical information medium such as, e.g., an optical disc.

The invention claimed is:

1. An optical head device which records or reproduces information on or from a first optical information medium having three or more recording layers, comprising:
    a first laser light source which emits a first light beam;
    a focusing optical system which focuses the first light beam emitted from the first laser light source onto one of the recording layers of the first optical information medium;
    a photodetector which receives the first light beam reflected by the recording layer of the first optical information medium and outputs an electric signal in accordance with an amount of the received first light beam; and
    a first light blocking region disposed on a light flux of the reflected light beam resulting from the reflection by the recording layer on which the first light beam is focused, to block, when there are at least two recording layers on a first light beam incident side of the recording layer on which the first light beam is focused or on a side thereof opposite to the first light beam incident side, reflected light beams resulting from reflection by the at least two recording layers which are incident on a region in the photodetector where the reflected light beams resulting from the reflection by the at least two recording layers interfere with each other, wherein
    the first light blocking region is not formed on an optical axis of the reflected light beam resulting from the reflection by the recording layer on which the first light beam is focused,
    the first light blocking region is a region surrounding the optical axis of the reflected light beam resulting from the reflection by the recording layer on which the first light beam is focused, and
    an outer edge of the first light blocking region is closer to the optical axis than an outer edge of an effective light flux of the reflected light beam resulting from the reflection by the recording layer on which the first light beam is focused.

2. The optical head device according to claim 1, wherein the first light blocking region has a ring shape.

3. The optical head device according to claim 1, wherein the first light blocking region has a ring shape at least a portion of which is missing.

4. The optical head device according to claim 1, wherein the first light blocking region is formed on a diffractive optical element which diffracts the reflected light beam resulting from the reflection by the recording layer on which the first light beam is focused.

5. The optical head device according to claim 1, further comprising:
    a second light blocking region disposed on a center point of the reflected light beam resulting from the reflection by the recording layer on which the first light beam is focused, to block the reflected light beams resulting from the reflection by the at least two recording layers, wherein
    the second light blocking region is disposed inwardly of the first light blocking region.

6. The optical head device according to claim 5, wherein the second light blocking region is formed on a diffractive optical element which diffracts the reflected light beam resulting from the reflection by the recording layer on which the first light beam is focused.

7. An optical head device which records or reproduces information on or from a first optical information medium having three or more recording layers, comprising:
    a first laser light source which emits a first light beam;
    a focusing optical system which focuses the first light beam emitted from the first laser light source onto one of the recording layers of the first optical information medium;
    a photodetector which receives the first light beam reflected by the recording layer of the first optical information medium and outputs an electric signal in accordance with an amount of the received first light beam;
    a first light blocking region disposed on a light flux of the reflected light beam resulting from the reflection by the recording layer on which the first light beam is focused, to block, when there are at least two recording layers on a first light beam incident side of the recording layer on which the first light beam is focused or on a side thereof opposite to the first light beam incident side, reflected light beams resulting from reflection by the at least two recording layers which are incident on a region in the photodetector where the reflected light beams resulting from the reflection by the at least two recording layers interfere with each other; and a second laser light source which emits a second light beam at a wavelength longer than that of the first light beam, wherein the first light blocking region is not formed on an optical axis of the reflected light beam resulting from the reflection by the recording layer on which the first light beam is focused, the focusing optical system focuses the first light beam emitted from the first laser light source onto one of the recording layers of the first optical information medium and focuses the second light beam emitted from the second laser light source onto a recording layer of a second optical information medium different from the first optical information medium, and the first light blocking region has a wavelength selective light blocking property which blocks the first light beam, and transmits the second light beam.

8. The optical head device according to claim 7, wherein the first light beam includes a blue light beam.

9. The optical head device according to claim 8, wherein the second light beam includes a red light beam.

10. The optical head device according to claim 8, wherein the second light beam includes an infrared light beam.

11. The optical head device according to claim 7, wherein the focusing optical system includes two objective lenses having mutually different optical axes.

12. The optical head device according to claim 7, wherein a phase difference P imparted by the first light blocking region to the second light beam is given by the following expression, in which N is an integer, and an absolute value of C is not more than 1/10 of $2\pi$:

$$P=2\pi N+C.$$

13. The optical head device according to claim 12, wherein the phase difference P imparted by the first light blocking region to the second light beam satisfies $1.8\pi \leq |P| \leq 2.2\pi$.

14. The optical head device according to claim 7, further comprising:

a third laser light source which emits a third light beam at a wavelength longer than that of the second light beam, wherein the first light beam includes a blue light beam, the second light beam includes a red light beam, the third light beam includes an infrared light beam, the focusing optical system focuses the infrared light beam emitted from the third laser light source onto a recording layer of a third optical information medium different from the first optical information medium and the second optical information medium, and the first light blocking region has a wavelength selective light blocking property which blocks the blue light beam, transmits the red light beam, and transmits also the infrared light beam.

15. An optical head device, comprising:

a laser light source which emits a light beam;

a focusing optical system which focuses the light beam emitted from the laser light source onto a recording layer of an optical information medium;

a photodetector which receives the light beam reflected by the recording layer of the optical information medium and outputs an electric signal in accordance with an amount of the received light beam; and a light blocking region disposed on a light flux of the reflected light beam resulting from the reflection by the recording layer on which the light beam is focused, wherein the light blocking region is not formed on an optical axis of the reflected light beam resulting from the reflection by the recording layer on which the light beam is focused, the light blocking region is a region surrounding the optical axis of the reflected light beam resulting from the reflection by the recording layer on which the light beam is focused, and an outer edge of the light blocking region is closer to the optical axis than an outer edge of an effective light flux of the reflected light beam resulting from the reflection by the recording layer on which the light beam is focused.

16. An optical information device, comprising:

the optical head device according to claim 1;

a motor which rotates an optical information medium; and a control unit which controls the optical head device and the motor.

17. An information processing device, comprising:

the optical information device according to claim 16; and an information processing unit which processes information to be recorded on the optical information device and/or information reproduced from the optical information device.

* * * * *